United States Patent
Horigome et al.

(10) Patent No.: US 11,970,186 B2
(45) Date of Patent: Apr. 30, 2024

(54) ARITHMETIC OPERATION SYSTEM FOR VEHICLES

(71) Applicant: Mazda Motor Corporation, Hiroshima (JP)

(72) Inventors: Daisuke Horigome, Hiroshima (JP); Shinsuke Sakashita, Hiroshima (JP); Masato Ishibashi, Hiroshima (JP); Eiichi Hojin, Hiroshima (JP); Akihiro Mitani, Hiroshima (JP); Kiyoyuki Tsuchiyama, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 378 days.

(21) Appl. No.: 17/468,693

(22) Filed: Sep. 8, 2021

(65) Prior Publication Data
US 2021/0403038 A1 Dec. 30, 2021

Related U.S. Application Data

(63) Continuation of application No. PCT/JP2020/008898, filed on Mar. 3, 2020.

(30) Foreign Application Priority Data

Mar. 8, 2019 (JP) .................. 2019-043108

(51) Int. Cl.
*B60W 60/00* (2020.01)
*B60W 30/09* (2012.01)
*B60W 50/00* (2006.01)

(52) U.S. Cl.
CPC ........ *B60W 60/0011* (2020.02); *B60W 30/09* (2013.01); *B60W 50/0098* (2013.01); *B60W 2050/0028* (2013.01)

(58) Field of Classification Search
CPC ............ B60W 60/0011; B60W 30/09; B60W 2050/0028; B60W 50/0098
See application file for complete search history.

(56) References Cited

U.S. PATENT DOCUMENTS 11,466,997 B1 * 10/2022 Williams .............. B64C 39/024
2015/0012166 A1 1/2015 Hauler et al.
(Continued)

FOREIGN PATENT DOCUMENTS

JP 2018-132996 A 8/2018

OTHER PUBLICATIONS

International Search Report and Written Opinion dated Jun. 2, 2020, received for PCT Application PCT/JP2020/008898, Filed on Mar. 3, 2020, 8 pages including English Translation.

*Primary Examiner* — Gertrude Arthur Jeanglaude
(74) *Attorney, Agent, or Firm* — XSENSUS LLP

(57) ABSTRACT

An automotive arithmetic system includes a main arithmetic unit that generates a travel route using deep learning based on an output from a vehicle external information acquisition device; an auxiliary arithmetic unit that generates a rule-based travel route in a free space without using deep learning; a safe route generation unit that generates a safe route, which is a route that the motor vehicle takes until the motor vehicle stops at a safe stop position; and an override processing unit that prioritizes one of the travel route generated by the main arithmetic unit, the rule-based travel route generated by the auxiliary arithmetic unit, or the safe route generated by the safe route generation unit, and determines a target motion of the motor vehicle so that the motor vehicle travels on the prioritized route.

20 Claims, 18 Drawing Sheets

(56) References Cited

U.S. PATENT DOCUMENTS

| | | | |
|---|---|---|---|
| 2015/0260531 A1* | 9/2015 | Ehsani | G01C 21/3484 |
| | | | 701/538 |
| 2017/0249839 A1* | 8/2017 | Becker | G08G 1/096725 |
| 2018/0232636 A1 | 8/2018 | Kawaguchi | |
| 2018/0288586 A1* | 10/2018 | Tran | H04Q 9/00 |
| 2018/0292825 A1 | 10/2018 | Smolyanskiy et al. | |

\* cited by examiner

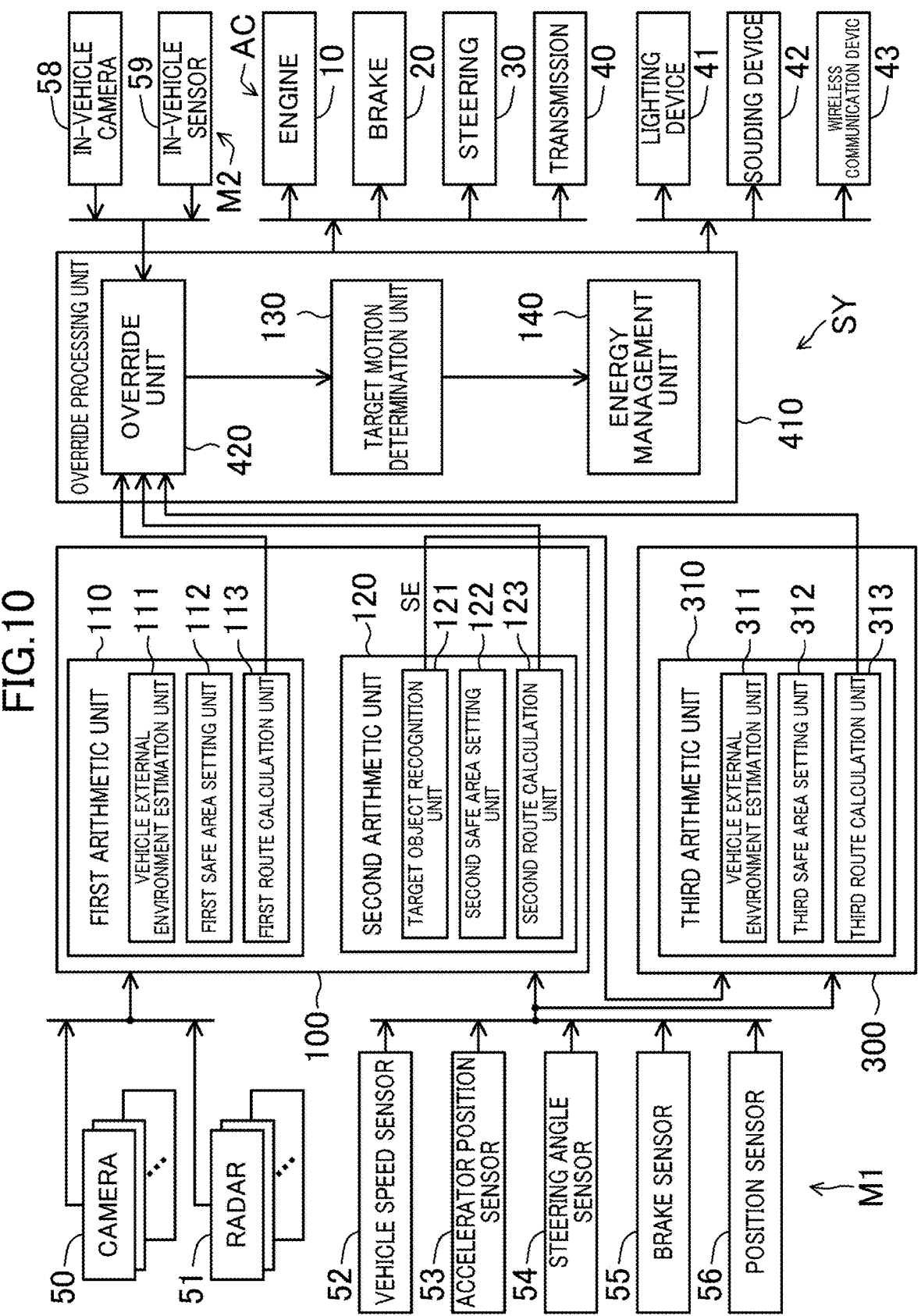

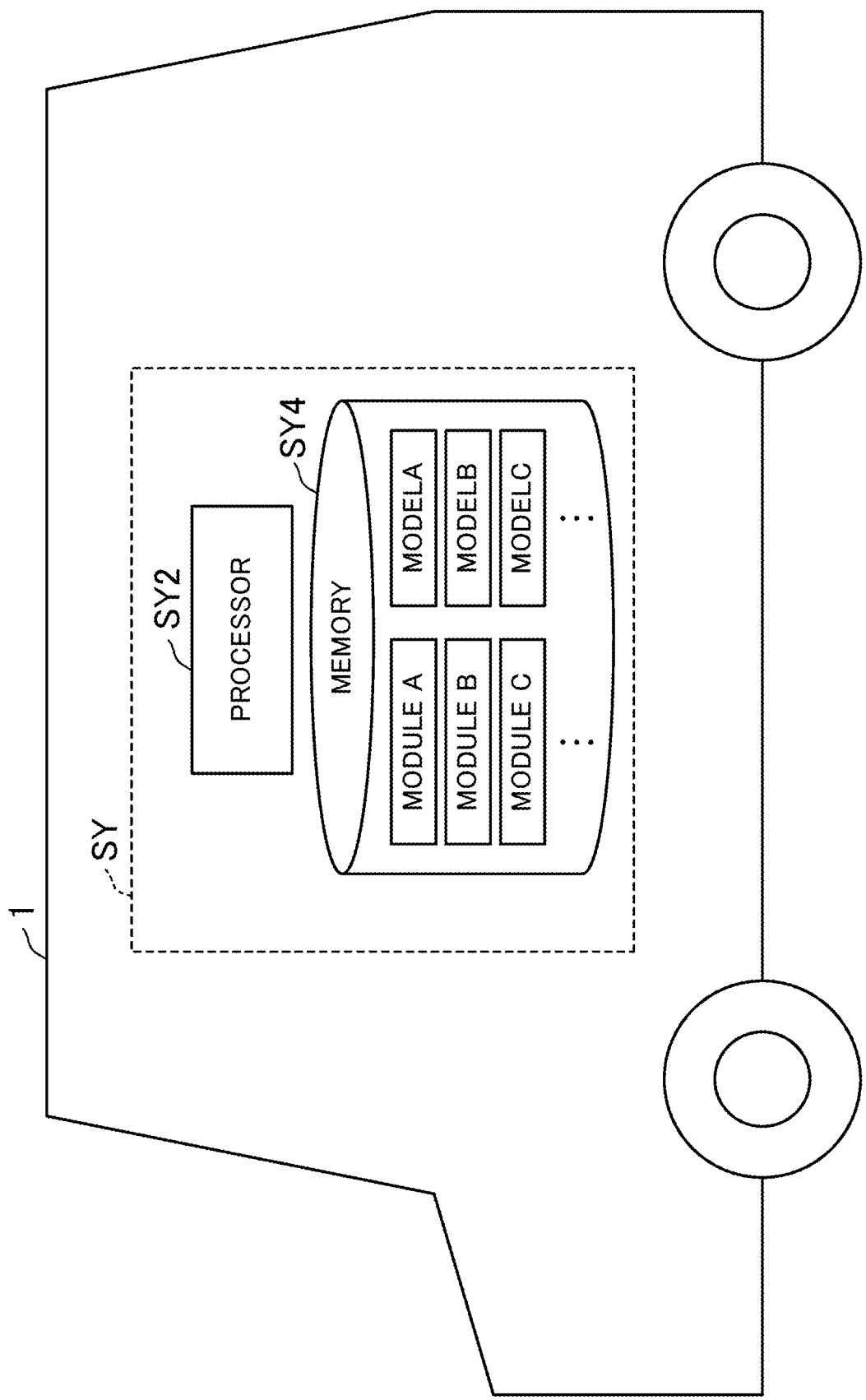

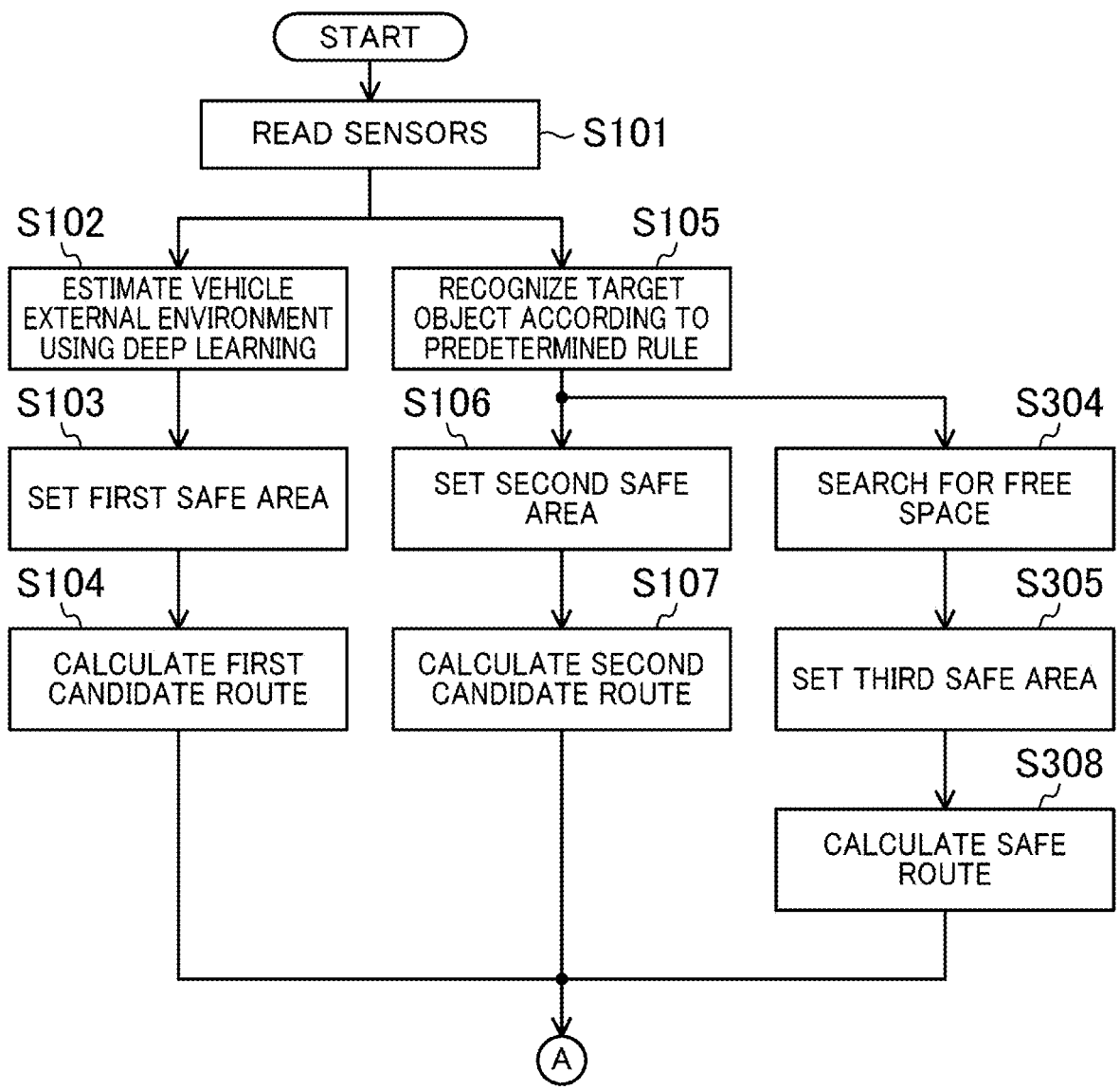

ARITHMETIC OPERATION SYSTEM FOR VEHICLES

CROSS-REFERENCE TO RELATED APPLICATIONS

The present application claims priority to international application PCT/JP2020/008898, filed Mar. 3, 2020, and Japanese application number 2019-043108 filed in the Japanese Patent Office on Mar. 8, 2019, the entire contents of both of which being incorporated herein by reference.

TECHNICAL FIELD

The present disclosure relates to an automotive arithmetic system used for autonomous driving of a motor vehicle, for example.

BACKGROUND

A technique of environmental recognition inside and outside a vehicle using deep learning based on a neural network has also been applied to motor vehicles.

For example, Patent Document 1 discloses an estimation device that estimates an occupant's condition with respect to vehicle equipment and includes a memory and a processing unit. The memory stores a model constructed through deep learning using a neural network, and the processing unit receives an image including the equipment, estimates the occupant's condition using the model, and outputs first information indicating a skeleton position of a specific part of the occupant and second information indicating the occupant's condition with respect to the equipment.

CITATION LIST

Patent Document

Patent Document 1: Japanese Unexamined Patent Publication No. 2018-132996

SUMMARY

Technical Problems

In recent years, development of autonomous driving systems has been promoted nationally. In general, an autonomous driving system obtains information of a vehicle external environment using a camera or any other suitable means, and calculates a route that the motor vehicle should take based on the obtained information of the vehicle external environment. What is important for the route calculation is the recognition of the vehicle external environment, and use of deep learning for the recognition of the vehicle exterior environment has been considered.

As a concept of software design for functional safety of an arithmetic device that performs autonomous driving, for example, Functional Safety for Road Vehicles standard (ISO 26262) defines Automotive Safety Integrity Level (ASIL) as a hazard assessment index regarding the application of functional safety of a plurality of modules constituting a program. According to ASIL, development at a design level corresponding to a functional safety level from ASIL-A to ASIL-D is required.

However, the recognition of the vehicle external environment and the route calculation using deep learning are still under development, and are considered to remain at around ASIL-B. Therefore, in order to give a functional safety level of about ASIL-D to a motor vehicle having the autonomous driving function, it is insufficient to configure the arithmetic device only with the function using deep learning.

The present disclosure has been made in view of the foregoing background, and one aspect thereof is to improve the functional safety level of an automotive arithmetic system having the function of using deep learning.

Solution to the Problems

In one aspect, the present disclosure is directed to an automotive arithmetic system mounted on a motor vehicle. The automotive arithmetic system includes: a main arithmetic unit that estimates a vehicle external environment including a road and an obstacle using deep learning based on an output from a vehicle external information acquisition device that acquires information of the vehicle external environment, and generates a travel route of the motor vehicle based on the estimated vehicle external environment; an auxiliary arithmetic unit that estimates the presence of the road and the obstacle based on the output from the vehicle external information acquisition device according to a predetermined rule without using deep learning, and generates a rule-based travel route in a free space on the road where no obstacle is present;

a safe route generation unit that generates a safe route, which is a travel route that the motor vehicle takes until the motor vehicle stops at a safe stop position that satisfies a preset criterion, based on the output from the vehicle external information acquisition device without using deep learning; and an override processing unit that prioritizes one of the travel route generated by the main arithmetic unit, the rule-based travel route generated by the auxiliary arithmetic unit, or the safe route generated by the safe route generation unit, and determines a target motion of the motor vehicle so that the motor vehicle travels on the prioritized route.

According to this configuration, the main arithmetic unit that uses deep learning and the auxiliary arithmetic unit and the safe route generation unit that do not use deep learning are provided, and the override processing unit prioritizes any one of the routes over the others. Specifically, the travel route that ensures safety can be selected based on the state of the vehicle. This can improve the functional safety level of the automotive arithmetic system having the function of using deep learning.

In addition, when determining the target motion, the safe route generation unit generates the safe route based on the output of the vehicle external information acquisition device, and determines the target motion for taking the safe route according to the information of the vehicle internal environment. Thus, the target motion can be determined to be suitable for the vehicle internal environment.

The information of the vehicle internal environment is a concept including information indicating the state of the vehicle and information indicating the condition of the driver. The information indicating the state of the vehicle includes, for example, information acquired from various sensors or any other devices attached to the vehicle, and information of an operation performed on the vehicle by the driver. The information indicating the condition of the driver includes, for example, information acquired from a camera that takes images inside the vehicle, various in-vehicle sensors for obtaining biological information of the driver, or a sensor for measuring a driving environment inside the vehicle such as temperature and humidity inside the vehicle, and information of an operation (handling) performed on the vehicle by the driver.

In one embodiment of the automotive arithmetic system, the override processing unit determines the route to be prioritized based on an output from a vehicle internal information acquisition device that acquires vehicle internal environment information including a state of a vehicle and a condition of a driver.

According to this configuration, the target motion can be determined to be suitable for the vehicle internal environment. Specifically, for example, the override processing unit may prioritize the safe route if the vehicle is determined to have failed based on the state of the vehicle received from the vehicle internal information acquisition device. Alternatively, for example, the override processing unit may prioritize the safe route if a driving ability of the driver is determined to have decreased based on the state of the vehicle received from the vehicle internal information acquisition device.

Further, the override processing unit that has prioritized the safe route may cause at least one of a lighting device, a sounding device, or a wireless communication device mounted on the motor vehicle to operate in a mode different from a predetermined normal traveling mode.

According to this configuration, if the vehicle has failed or the driving ability of the driver has decreased, the safety level can be improved in consideration of the surrounding vehicles. For example, when the wireless communication device is operated, the wireless communication device can inform the outside of the vehicle failure or the decrease in the driver's driving ability.

Advantages

As can be seen from the description herein, the present disclosure can improve the safety level of an arithmetic device having the function of using deep learning, and can cause the arithmetic device to behave safely in accordance with the states of the traveling vehicle and passengers.

BRIEF DESCRIPTION OF THE DRAWINGS

FIG. 10 is a block diagram illustrating a functional configuration of an automotive arithmetic system according to a second embodiment according to one or more aspects of the present disclosure.

FIG. 11 is a view illustrating an exemplary configuration of a motor vehicle equipped with the arithmetic system of the second embodiment according to one or more aspects of the present disclosure.

FIG. 12A is a flowchart illustrating operation processing of the arithmetic system of the second embodiment according to one or more aspects of the present disclosure.

DESCRIPTION OF EMBODIMENTS

Figure 1:
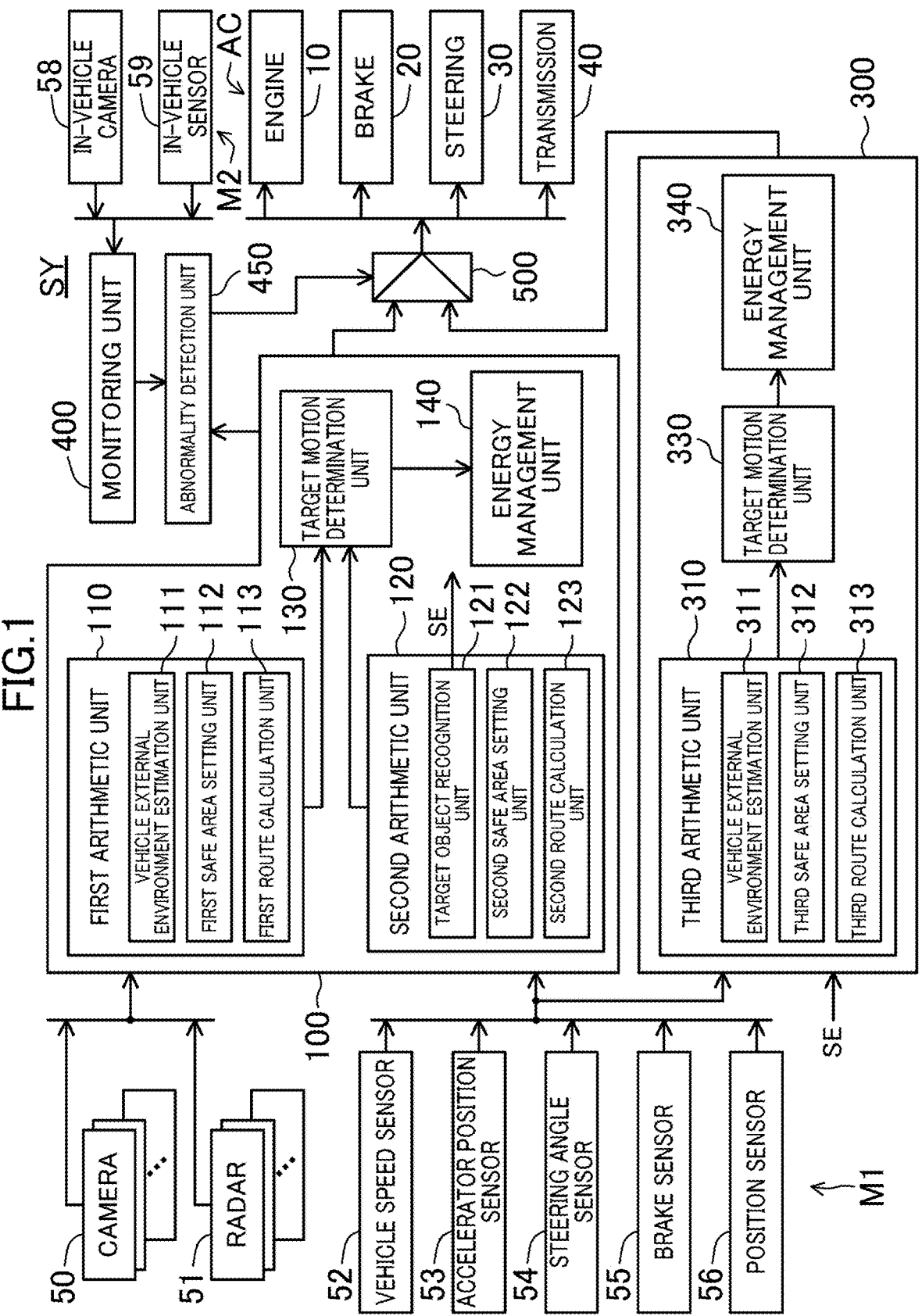
FIG. 1 is a block diagram illustrating a functional configuration of an automotive arithmetic system according to one or more aspects of the present disclosure.

Exemplary embodiments will be described in detail below with reference to the drawings.

As will be described in detail below, the arithmetic system SY may include a vehicle external environment estimation unit 111, 311 and/or a vehicle external information acquisition device M1 (as further described in U.S. application Ser. No. 17/120,292 filed Dec. 14, 2020, and U.S. application Ser. No. 17/160,426 filed Jan. 28, 2021, the entire contents of each of which being incorporated herein by reference), a first arithmetic unit 110 that functions as a route generation unit (as further described in more detail in U.S. application Ser. No. 17/161,691, filed 29 Jan. 2021, U.S. application Ser. No. 17/161,686, filed 29 Jan. 2021, and U.S. application Ser. No. 17/161,683, the entire contents of each of which being incorporated herein by reference), a target motion determination unit 130 (as further described in more detail in US application Ser. No. 17/159,178, filed Jan. 27, 2021, the entire contents of which being incorporated herein by reference), an energy management unit 140 (as further described in more detail in U.S. application Ser. No. 17/159,178, supra), a route searching unit 706 (as further described in more detail in U.S. application Ser. No. 17/159,178, supra), a vehicle state measurement unit 901 (as further described in PCT application WO2020184297A1 filed Mar. 3, 2020, the entire contents of which being incorporated herein by reference), a driver's operation recognition unit 902 (as further described in U.S. application Ser. No. 17/160,426 filed Jan. 28, 2021, the entire contents of which being incorporated herein by reference), a vehicle internal information acquisition device M2 (as further described in U.S. application Ser. No. 17/156,631 filed Jan. 25, 2021, the entire contents of which being incorporated herein by reference), and vehicle external environment model 704 (as further described in U.S. application Ser. No. 17/160,426, supra).

First Embodiment

FIG. 1 illustrates a configuration of an automotive arithmetic system SY (may be hereinafter simply referred to as an "arithmetic system SY") according to a first embodiment. The arithmetic system SY is, for example, an arithmetic system mounted on a four-wheel motor vehicle 1. The motor vehicle 1 is a motor vehicle that can be driven manually in accordance with the operation of an accelerator and the like by a driver, can assist the driver's operation during driving, and can be driven autonomously without the driver's operation. In the following description, the motor vehicle 1 equipped with the arithmetic system SY may be referred to as a "subject vehicle 1" in order to distinguish the motor vehicle 1 from other vehicles.

The arithmetic system SY determines a target motion of the motor vehicle 1 based on the outputs from a plurality of sensors and the like, and control the actuation of the devices.

A vehicle external information acquisition device M1 including sensors and the like that output information of an environment outside the motor vehicle 1 to the arithmetic system SY includes, for example: (1) a plurality of cameras 50 provided to a body or the like of the motor vehicle 1 to take images of a vehicle external environment; (2) a plurality of radars 51 provided to the body or the like of the vehicle 1 to detect targets or the like outside the vehicle; (3) a vehicle speed sensor 52 that detects an absolute velocity of the motor vehicle 1; (4) an accelerator position sensor 53 that detects how much an accelerator pedal of the motor vehicle 1 is depressed; (5) a steering angle sensor 54 that detects a rotational angle (steering angle) of a steering wheel of the motor vehicle 1; (6) a brake sensor 55 that detects how much a brake pedal of the motor vehicle 1 is depressed; and (7) a position sensor 56 that detects the position of the motor vehicle 1 (vehicle position information) using Global Positioning System (GPS).

The cameras 50 are arranged, for example, to be able to take images of the surroundings of the motor vehicle 1 at 360 degrees in the horizontal direction. Each of the cameras 50 generates image data by capturing an optical image showing the vehicle external environment. Each of the cameras 50 outputs the generated image data to a main arithmetic device 100. The cameras 50 are an example of a vehicle external information acquisition device that acquires information of the vehicle external environment.

The radars 51 are arranged so that their detection range covers 360 degrees of the motor vehicle 1 in the horizontal direction, just like the cameras 50. The type of the radars 51 is not particularly limited. For example, millimeter wave radars or infrared radars can be adopted. The radars 51 are an example of the vehicle external information acquisition device that acquires information of the vehicle external environment.

A vehicle internal information acquisition device M2 including sensors and the like that output information of an internal environment of the motor vehicle 1 to the arithmetic system SY includes: (1) an in-vehicle camera 58 provided for an in-vehicle mirror and/or dashboard of the motor vehicle 1 and captures an expression and posture of the driver and an environment inside the vehicle; and (2) an in-vehicle sensor 59 that acquires biological information (such as body temperature, heart rate, and respiration) of the driver. The vehicle internal information acquisition device M2 may include various sensors (not shown) attached to components of the motor vehicle to measure the state of the vehicle. Some of the sensors of the vehicle external information acquisition device M1 may also be used as the vehicle internal information acquisition device M2.

Objects controlled by the arithmetic system SY include, for example, an engine 10, a brake 20, a steering 30, and a transmission 40. In the following description, for convenience of explanation, the objects controlled by the arithmetic system SY (including the engine 10, the brake 20, the steering 30, and the transmission 40) will be collectively referred to as "actuators AC."

The engine 10 is a power drive source, and includes an internal combustion engine (a gasoline engine or a diesel engine). The arithmetic system SY outputs an engine output alteration signal to the engine 10 when the motor vehicle 1 needs to be accelerated or decelerated. The engine 10 is controlled by the degree of depression of the accelerator pedal by the driver during manual driving, but is controlled based on a target motion signal indicating a target motion outputted from the arithmetic system SY (will be hereinafter simply referred to as a "target motion signal") during assisted driving and autonomous driving. Although not shown, a generator that generates electric power by the output of the engine 10 is connected to a rotational shaft of the engine 10.

The brake 20 is an electric brake. When the motor vehicle 1 needs to slow down, the arithmetic system SY outputs a brake request signal to the brake 20. The brake 20 that has received the brake request signal operates a brake actuator (not shown) based on the brake request signal to decelerate the motor vehicle 1. The brake 20 is controlled by the degree of depression of the brake pedal by the driver during the manual driving, but is controlled based on the target motion signal outputted from the arithmetic system SY during the assisted driving and the autonomous driving.

The steering 30 is an electric power steering (EPS). The arithmetic system SY outputs a steering direction alteration signal to the steering 30 when the traveling direction of the motor vehicle 1 needs to be changed. The steering 30 is controlled by the degree of handling of a steering wheel (a so-called wheel) by the driver during the manual driving, but is controlled based on the target motion signal outputted from the arithmetic system SY during the assisted driving or the autonomous driving.

The transmission 40 is a multi-speed transmission. The main arithmetic device 100 outputs a gear change signal to the transmission 40 in accordance with the driving force to be outputted. The transmission 40 is controlled by the handling of a shift lever by the driver and the degree of depression of the accelerator pedal by the driver during the manual driving, but is controlled based on the target motion calculated by the main arithmetic device 100 during the assisted driving and the autonomous driving.

During the manual driving, the arithmetic system SY outputs a control signal based on the output of the accelerator position sensor 53 or the like to the engine 10, for example. During the assisted driving or the autonomous driving, the arithmetic system SY sets a travel route of the motor vehicle 1, and outputs the control signal to the engine 10 and other actuators so that the motor vehicle 1 travels on the travel route.

<1. Configuration of Arithmetic System>

As shown in FIG. 1, the arithmetic system SY includes a main arithmetic device 100, a backup arithmetic device 300, a monitoring unit 400, an abnormality detection unit 450, and a selector circuit 500.

When performing the assisted driving or the autonomous driving, the main arithmetic device 100 determines the target motion of the motor vehicle 1 based on the output from the vehicle external information acquisition device M1, and outputs a control signal for operating the actuators AC in accordance with the target motion.

The backup arithmetic device 300 generates a safe route based on the output from the vehicle external information acquisition device M1, and determines a backup target motion which is a target motion for causing the motor vehicle to travel on the safe route. Further, the backup arithmetic device 300 outputs a backup control signal which is a control signal for operating the actuators AC in accordance with the backup target motion. The safe route mentioned herein refers to a travel route that the traveling motor vehicle takes until the motor vehicle stops at a safe stop position TP that satisfies a preset criterion. The safe stop position TP is not particularly limited as long as it is a position at which the motor vehicle 1 can safely stop, for example. Examples of the safe stop position TP include a vehicle free area on a road where no motor vehicles 1 are passing and a road shoulder 8 (see FIG. 3). For example, when an abnormality is detected by an abnormality detection unit 450 which will be described later, the backup target motion includes (1) a target motion for causing the vehicle to immediately decelerate to a slow speed level and travel slowly to the safe stop position TP while blowing a horn with hazard lamps on, and (2) a target motion for causing the subject vehicle 1 to travel to the safe stop position TP taking a nearby traffic amount into consideration without disturbing nearby vehicles as possible.

Each of the main arithmetic device 100 and the backup arithmetic device 300 is a microprocessor including one or more chips, and includes a CPU, a memory, and any other suitable elements. This configuration can reduce the risk of simultaneous failure of both devices. FIG. 1 shows the configuration that allows the function according to the present embodiment (the route generating function to be described later) to be executed, and does not necessarily show all the functions the main arithmetic device 100 and the backup arithmetic device 300 have.

The monitoring unit 400 monitors the condition of the driver based on the output from the vehicle internal information acquisition device M2, and outputs the result to the abnormality detection unit 450.

The abnormality detection unit 450 is configured to be able to detect a failure of the main arithmetic device 100. A method of detecting the failure of the main arithmetic device 100 is not particularly limited. For example, applicable methods include a known hardware redundancy circuit (e.g., a dual core lockstep), monitoring of an operation result in a chip, monitoring of a flag register indicating an abnormality in a chip, a test circuit (logic build-in self-test (LBIST) circuit) in a chip, and mutual monitoring between chips. Further, the abnormality detection unit 450 is configured to be able to detect that the driver is in an abnormal state based on the information of the driver received from the vehicle internal information acquisition device M2.

The selector circuit 500, which is realized by, for example, a selector circuit, selects either the control signal outputted from the main arithmetic device 100 or the backup control signal outputted from the backup arithmetic device 300 based on the detection result of the abnormality detection unit 450, and outputs the selected signal to the actuators AC of the motor vehicle 1. Specifically, the selector circuit 500 selects and outputs the control signal outputted from the main arithmetic device 100 during a normal operation, and selects and outputs the backup control signal outputted from the backup arithmetic device 300 when either the main arithmetic device 100 or the driver is detected to be in an abnormal state.

Components of the arithmetic system SY will be described in further detail below.

—1-1. Configuration of Main Arithmetic Device—

The main arithmetic device 100 includes a first arithmetic unit 110, a second arithmetic unit 120, a target motion determination unit 130, and an energy management unit 140.

The first arithmetic unit 110 has the function of estimating the vehicle external environment using deep learning and generating a first route that is a route based on the estimated vehicle external environment. That is, the first arithmetic unit 110 functions as a route generation unit. Further details of the route generation unit may be found, e.g., in co-pending U.S. application Ser. No. 17/123,116, the entire contents of which is hereby incorporated by reference. Specifically, the first arithmetic unit 110 includes a vehicle external environment estimation unit 111, a first safe area setting unit 112, and a first route calculation unit 113. The "first route" will be described by way of examples in the section "2. Operation of Arithmetic System" to be described later.

The vehicle external environment estimation unit 111 estimates the vehicle external environment through image recognition processing using deep learning based on the outputs of the cameras 50 and the radars 51. Specifically, the vehicle external environment estimation unit 111 constructs object identification information through deep learning based on image data from the cameras 50, and integrates the object identification information with positioning information from the radars to create a 3D map representing the vehicle external environment. Further, for example, estimation of objects' behavior based on deep learning is integrated with the 3D map to generate an environment model. The deep learning uses, for example, a multilayer neural network (deep neural network (DNN)). Examples of the multilayer neural network include a convolutional neural network (CNN).

The first safe area setting unit 112 sets a first safe area SA1 (see FIG. 3) with respect to the vehicle external environment (e.g., a 3D map) estimated by the vehicle external environment estimation unit 111. The first safe area SA1 is set using a model constructed through deep learning as an area which the subject vehicle can pass. The model is constructed, for example, through reconstruction of a model previously constructed for each type of the motor vehicle 1 based on, e.g., the past driving history of the driver. The first safe area SA1 is what is called free space. For example, the free space is an area on the road without any dynamic obstacle such as other vehicles or pedestrians, and any static obstacle such as a median strip or traffic poles. The first safe area SA1 may include a space of a road shoulder where the vehicle can stop in case of emergency.

Using reinforcement learning, the first route calculation unit 113 calculates a first candidate route that passes within the first safe area SA1 set by the first safe area setting unit 112. The reinforcement learning is the function of setting an evaluation function for the result of a series of simulation (the candidate route in this example), and giving a high rating to the simulation result that meets a certain purpose, or a low rating to the simulation result that does not meet the certain purpose, thereby learning a candidate route that meets the purpose. An actual calculation method will be described later.

The second arithmetic unit 120 has the function of recognizing an object outside the vehicle based on the output from the vehicle external information acquisition device M1 (e.g., the cameras 50 and the radars 51) according to a predetermined rule without using deep learning, and specifying a safe area based on the recognized object outside the vehicle. The second arithmetic unit 120 additionally has the function of generating a second route passing the specified safe area. That is, the second arithmetic unit 120 functions as a route generation unit. Specifically, the second arithmetic unit 120 includes a target object recognition unit 121 (corresponding to an object recognition unit), a second safe area setting unit 122 (corresponding to a safe area specifying unit), and a second route calculation unit 123.

The target object recognition unit 121 recognizes a target object based on a target object recognition rule (corresponding to a predetermined rule). Examples of the target object include traveling vehicles, parked vehicles, or pedestrians present on a road. The target object recognition unit 121 also recognizes a relative distance and/or a relative speed between the subject vehicle and the target object. The target object recognition unit 121 also recognizes a roadway (including a lane marker and the like) based on the outputs from the cameras 50 and the radars 51.

The second safe area setting unit 122 sets a second safe area SA2 as an area where a collision with the target object recognized by the target object recognition unit 121 can be avoided. The second safe area SA2 is set based on a predetermined rule, e.g., an area of several meters around the target object is considered as a range where the collision is unavoidable. The second safe area setting unit 122 is configured to be able to set the second safe area SA2 in consideration of the speed of traveling vehicles and/or the speed of pedestrians. Note that the "target object recognition rule" and the "predetermined rule" are obtained by applying, to a rule-based approach, a method of recognizing and avoiding the target object that has been adopted to the motor vehicles, and have a functional safety level equivalent to ASIL-D. Just like the first safe area SA1, the second safe area SA2 is what is called free space. For example, the free space is an area on the road without any dynamic obstacle, such as other vehicles or pedestrians, and any static obstacle, such as a median strip or traffic poles. The second safe area SA2 may include a space of a road shoulder where the vehicle can stop in case of emergency.

The second route calculation unit 123 calculates a second route (corresponding to a rule-based travel route) that passes within the second safe area SA2 set by the second safe area setting unit 122. An actual calculation method will be described later.

The target motion determination unit 130 receives the outputs from the first and second arithmetic units 110 and 120, and determines the target motion of the motor vehicle 1. Receiving information of the first and second safe areas SA1 and SA2 and information of the first and second candidate routes in particular, the target motion determination unit 130 determines the target motion of the motor vehicle 1. Specifically, the target motion determination unit 130 sets a route that the motor vehicle 1 should take, and determines the operation amount (e.g., an engine torque or the operation amount of the brake actuator) required for the actuators AC (mainly, the engine 10, the brake 20, the steering 30, and the transmission 40) to cause the motor vehicle 1 to travel on the route.

The energy management unit 140 calculates the amount of control of the actuators AC at the highest energy efficiency to achieve the target motion determined by the target motion determination unit 130. Specifically, for example, the energy management unit 140 calculates the timing of opening or closing intake/exhaust valves (not shown) and the timing of injecting the fuel from injectors (not shown) at the most improved fuel efficiency to achieve the engine torque determined by the target motion determination unit 130. An operation example of the energy management unit 140 will be described more specifically later. Additionally, further details of the energy management unit 50 may be found, e.g., in co-pending U.S. application Ser. No. 17/159,175, the entirety of which is hereby incorporated by reference.

Data of the target motion determined by the target motion determination unit 130 and data of the control amount calculated by the energy management unit 140 are outputted to the selector circuit 500 as control signals for controlling the actuators AC.

—1-2. Configuration of Backup Arithmetic Device—

The backup arithmetic device 300 includes a backup arithmetic unit 310, a target motion determination unit 330, and an energy management unit 340.

The backup arithmetic unit 310 has the function of generating a safe route, which is a route to the safe stop position TP, based on the output from the vehicle external information acquisition device M1. That is, the backup arithmetic unit 310 functions as a safe route generation unit. Specifically, the backup arithmetic unit 310 includes a vehicle external environment estimation unit 311, a third safe area setting unit 312, and a safe route calculation unit 313. The "safe route" will be described by way of examples in the section "2. Operation of Arithmetic System" to be described later.

The vehicle external environment estimation unit 311 estimates the vehicle external environment using the data of the target object recognized by the target object recognition unit 121 of the second arithmetic unit 120. In addition, the vehicle external environment estimation unit 311 also recognizes a roadway (including a lane marker or the like) and a safe stop position TP at which the motor vehicle 1 can safely stop based on the output from the target object recognition unit 121. The safe stop position TP is not particularly limited as long as it is a position at which the motor vehicle 1 can safely stop. Examples of the safe stop position TP include a road shoulder 8 (see FIG. 3), and a vehicle free area on the road where no motor vehicles 1 are passing. For example, when no other vehicles are found in a range of several meters around the subject vehicle 1, the current position of the subject vehicle 1 or a position slightly ahead of the subject vehicle 1 can be the safe stop position TP. The motor vehicle 1 is stopped at such a place while operating a notification device such as hazard lamps, for example.

The third safe area setting unit 312 sets a third safe area SA3 as an area where a collision with the target object recognized by the vehicle external environment estimation unit 311 can be avoided. The third safe area SA3 is set based on a predetermined rule, e.g., an area of several meters around the target object is considered as a range where the collision is unavoidable. The third safe area setting unit 312 and the second safe area setting unit 122 may be configured in the same manner. In this case, the third safe area SA3 and the second safe area SA2 may be designated as the same area. The second safe area setting unit 122 and the third safe area setting unit 312 may be realized by a common circuit. However, in a preferred embodiment, the second and third safe area setting units 122 and 312 are separated from the viewpoint of increasing resistance to failure. The "predetermined rule" mentioned herein is also the same as the "predetermined rule" described above, and has a functional safety level equivalent to ASIL-D.

The safe route calculation unit 313 calculates a safe route RS which is a travel route that passes within the third safe area SA3 set by the third safe area setting unit 312 and reaches the safe stop position TP. An actual calculation method will be described later.

The target motion determination unit 330 receives the output from the backup arithmetic unit 310, and determines the target motion of the motor vehicle 1. Receiving information of the third safe area SA3 and information of the safe stop position TP in particular, the target motion determination unit 330 determines the target motion of the motor vehicle 1. Specifically, the target motion determination unit 330 sets a safe route that the motor vehicle 1 should take to reach the safe stop position TP, and determines the operation amount (e.g., an engine torque or the operation amount of the brake actuator) required for the actuators AC (mainly, the engine 10, the brake 20, and the steering 30) to cause the motor vehicle 1 to travel on the route.

The energy management unit 340 calculates the amount of control of the actuators AC (such as the engine 10 described later) at the highest safety level and the highest energy efficiency to achieve the target motion determined by the target motion determination unit 330, while taking whether the subject vehicle 1 and the driver are in an abnormal state or not into account. Specifically, for example, the energy management unit 140 calculates the timing of opening or closing intake/exhaust valves (not shown) and the timing of injecting the fuel from injectors (not shown) at the most improved fuel efficiency to achieve the engine torque determined by the target motion determination unit 130. For example, if the driver is in an abnormal state, the energy management unit 140 calculates a method of controlling the actuators AC that can reduce a burden on the driver as small as possible.

Data of the target motion determined by the target motion determination unit 130 and data of the control amount calculated by the energy management unit 140 are outputted to the selector circuit 500 as control signals for controlling the actuators AC.

<2. Operation of Arithmetic System>

The operation of the arithmetic system will be described below with reference to the drawings.

—2-1. Calculation of First Route and Second Route—

A method of calculating the first and second routes will be described below with reference to FIG. 2. As described above, the first and second routes are both calculated by the main arithmetic device 100.

Figure 2:
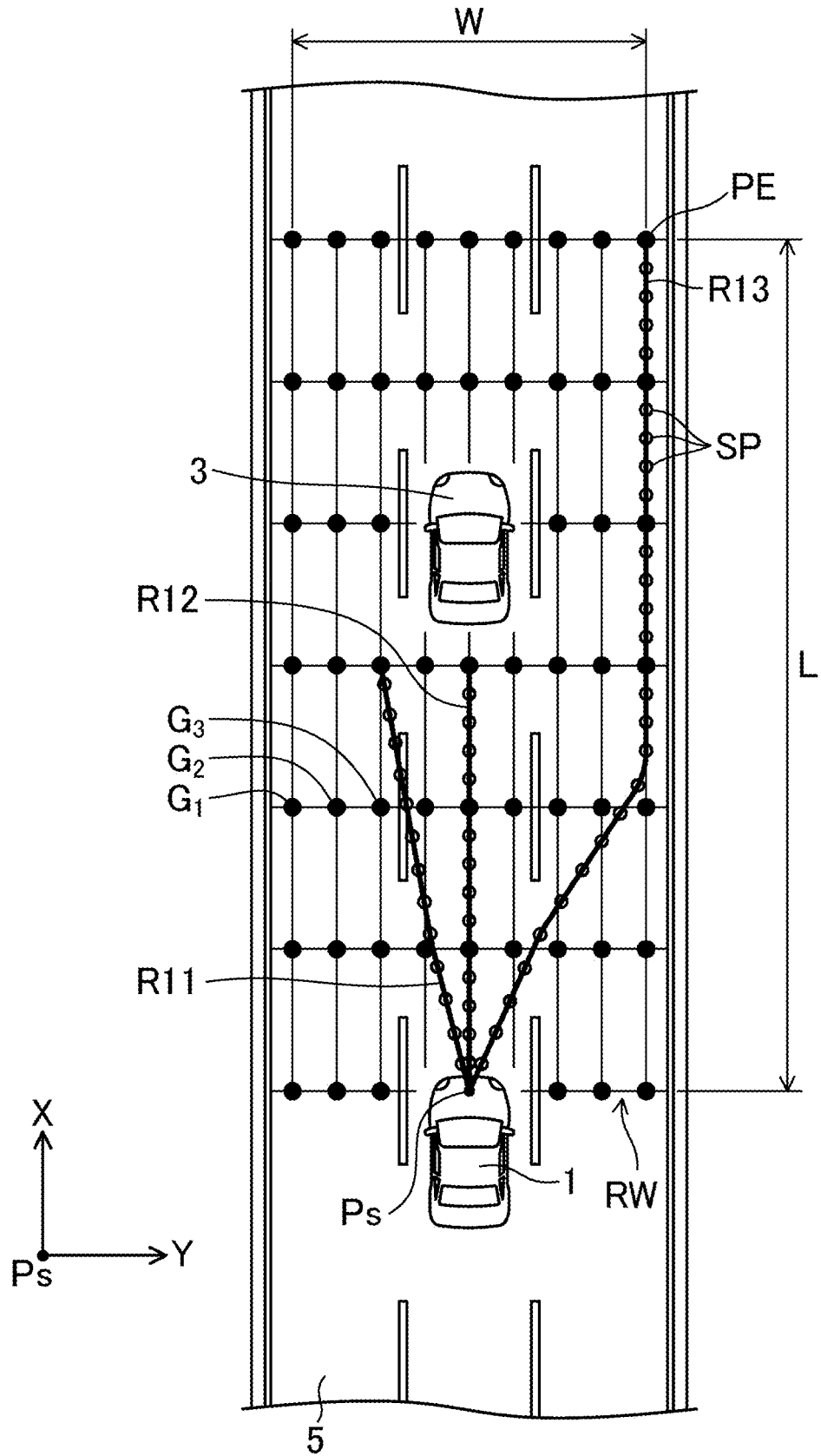
FIG. 2 is a view illustrating an example of a travel route set by the arithmetic system according to one or more aspects of the present disclosure.

Although the first safe area SA1 is not illustrated in the example of FIG. 2, the first route to be calculated is a route passing within the first safe area SA1. The first route is calculated when the driving mode of the motor vehicle 1 is the assisted driving or the autonomous driving, and is not calculated in the manual driving.

First, as shown in FIG. 2, the first route calculation unit 121 executes grid point set processing based on roadway information. In the grid point set processing, the main arithmetic device 100 first specifies the shape of the roadway 5 (i.e., the direction in which the roadway 5 extends and the width of the roadway), and sets a grid area RW including grid points Gn (n=1, 2, ..., N) on the roadway 5.

The grid area RW ranges from the periphery of the subject vehicle 1 to a predetermined distance ahead of the subject vehicle 1 along the roadway 5. The distance (longitudinal length) L is calculated based on the current vehicle speed of the subject vehicle 1. In the present embodiment, the distance L (L=V×t) is a distance that the vehicle is expected to travel at the current vehicle speed (V) for a predetermined fixed time t (e.g., three seconds). However, the distance L may be a predetermined fixed distance (e.g., 100 m) or may be a function of the vehicle speed (and acceleration). The width W of the grid area RW is set to be the width of the roadway 5.

The grid area RW is divided into a large number of rectangular grid sections by a plurality of grid lines extending along the extending direction X and width direction (lateral direction) Y of the roadway 5. Points of intersection of the grid lines in the X and Y directions are grid points Gn. Intervals in the X and Y directions between the grid points Gn are respectively set to fixed values. In the present embodiment, for example, the grid interval in the X direction is 10 m, and the grid interval in the Y direction is 0.875 m.

The grid interval may be a variable value according to the vehicle speed or the like. Since the roadway 5 shown in FIG. 2 is a straight section, the grid area RW and the grid sections are respectively set in a rectangular shape. When the roadway includes a curved section, the grid area and the grid sections may or may not be set in a rectangular shape.

Next, in the calculation of the first candidate route, the first route calculation unit 113 sets a predetermined grid point GT in the grid area RW as a target reach position PE, and sets the target speed at the target reach position PE (GT) in accordance with an external signal. The external signal is, for example, a guidance signal that guides the subject vehicle 1 to a destination (e.g., a parking area) transmitted from a navigation system (not shown) mounted on the subject vehicle 1.

Next, the first route calculation unit 113 executes arithmetic processing for route setting. In this arithmetic processing, the first route calculation unit 113 first executes candidate route calculation processing for calculating a plurality of first candidate routes R1$m$ (m=1, 2, 3, ...). This processing is similar to the calculation of the candidate route using the existing state lattice method.

The outline of the calculation of the candidate routes will be described below. The first route calculation unit 113 creates candidate routes from the current position PS (start point) of the subject vehicle 1 to each grid point Gn (end point) in the grid area RW. The first route calculation unit 113 also sets speed information at the end point.

The start point and the end point are connected via one or more grid points Gn or no grid points Gn. For each of the first candidate routes R1$m$, the first route calculation unit 113 calculates position information by fitting the distance between the grid points with a route curve pattern, and calculates a profile of speed change to be in conformity with a speed change pattern. The speed change pattern is generated as a combination of sharp acceleration (e.g., 0.3 G), slow acceleration (e.g., 0.1 G), constant vehicle speed, slow deceleration (e.g., −0.1 G), and sharp acceleration (e.g., −0.3 G), and is set not for each grid but for a predetermined length (e.g., 50 m to 100 m) of the first candidate route R1$m$.

Further, the first route calculation unit 113 sets sampling points SP for each candidate route, and calculates speed information at each sampling point SP. FIG. 2 shows only three first candidate routes R11, R12, R13 of a large number of candidate routes. In the present embodiment, each of the first candidate routes R1*m* is a route from the start point to a position at which the vehicle arrives after a fixed time (e.g., three seconds).

Next, the first route calculation unit 113 calculates a route cost taken by the obtained first candidate routes R1*m*. In the calculation of the route cost of each first candidate route R1*m*, the first route calculation unit 113 calculates, for each sampling point SP, an inertia force Fi due to the motion of the vehicle 1, collision probability Pc with an obstacle (the other vehicle 3 in this example), and an impact force Fc applied to the occupant upon the collision (or a reaction force against the collision), and calculates external forces FC to be applied to the occupant based on these values, thereby obtaining the sum of the external forces FC (absolute values) at all the sampling points SP on the first candidate route R1*m* as the route cost (candidate route cost) EPm of the first candidate route R1*m*.

Then, the first route calculation unit 113 outputs all the first candidate routes R1*m* to the target motion determination unit 130 together with their route cost information.

The first route is set in this manner.

The second route is basically calculated in the same manner as the first route. As the second route, a route having the lowest route cost is selected and outputted to the target motion determination unit 130.

In the first embodiment, the routes outputted to the target motion determination unit 130 include the first route calculated by the first arithmetic unit 110 and the second route calculated by the second arithmetic unit 120, but the target motion determination unit 130 basically adopts the first route. This is because the first route that is set using deep learning or reinforcement learning is more likely to be a route that reflects the driver's intention, i.e., a route that does not cause the driver to feel redundancy, such as being too cautious in avoiding the obstacle.

However, the recognition of the vehicle external environment using deep learning is till under development. That is, with an environment model constructed by using deep learning, accurate information can be calculated in a range similar to information on which the environment model is based. However, if an actual vehicle external environment greatly differs from the environment model, a vehicle external environment that is deviated from the actual vehicle external environment may be estimated.

Figure 3:
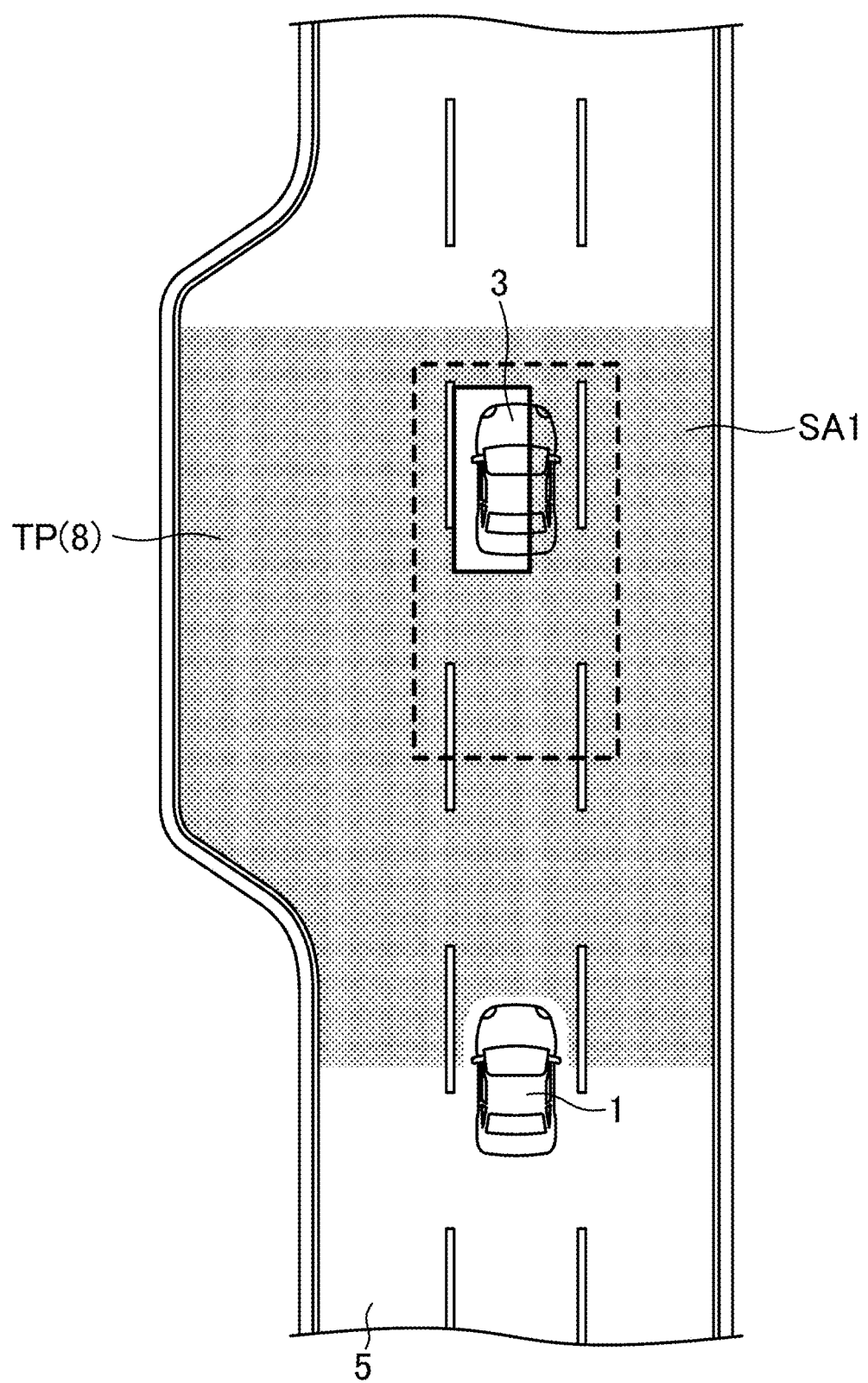
FIG. 3 is a view showing a comparison between a safe area set by a first arithmetic unit and a safe area set by a second arithmetic unit according to one or more aspects of the present disclosure.

For example, FIG. 3 illustrates the first safe area SA1 set by the first safe area setting unit 112 and the second safe area SA2 set by the second safe area setting unit 122. The first safe area SA1 is a hatched portion in FIG. 3, and the second safe area SA2 (see FIG. 4) is the hatched portion except for the inside of a dotted frame in FIG. 3. As shown in FIG. 3, part of the other vehicle 3 is included in the first safe area SA1. This may occur when the width of the other vehicle 3 cannot be accurately estimated in image recognition by deep learning.

As described above, in the recognition of the vehicle external environment using deep learning, the vehicle external environment deviating from the actual vehicle external environment may be estimated in some cases. Therefore, the function using deep learning is considered to be equivalent to ASIL-B in the functional safety level (ASIL) defined by Functional Safety for Road Vehicles standard (ISO 26262). Thus, some contrivance is required to improve the functional safety level.

Therefore, in the first embodiment, when the first route is within the second safe area SA2, the target motion determination unit 130 of the main arithmetic device 100 selects the first route as the route that the motor vehicle 1 (the subject vehicle 1) should take, and determines the target motion of the motor vehicle 1 so that the motor vehicle 1 takes the first route. On the other hand, when the first route deviates from the second safe area SA2, the target motion determination unit 130 does not select the first route as the route that the motor vehicle 1 should take. More specifically, if all of the plurality of first candidate routes R1*n* (n=1, 2, 3, . . . ) set as the candidate routes deviate from the second safe area SA2 in the calculation of the first route, the target motion determination unit 130 selects the second candidate route as the route that the motor vehicle 1 should take.

Figure 4:
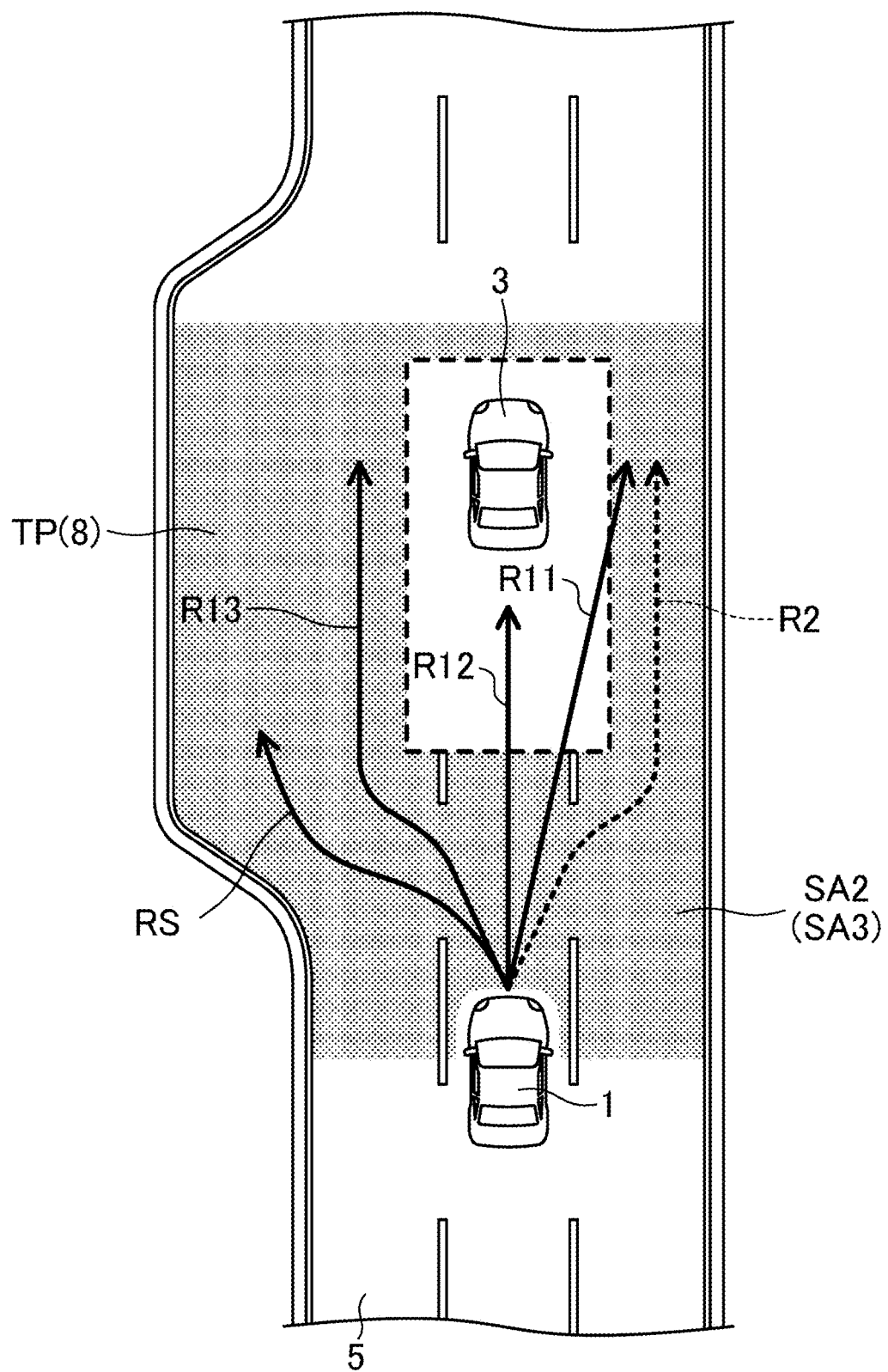
FIG. 4 is a view illustrating an example of relationship between a candidate route calculated based on a vehicle external environment estimated through deep learning and a safe area according to one or more aspects of the present disclosure.

For example, provided that the first candidate routes R11, R12, and R13 are set by the first route calculation unit 113 as illustrated in FIG. 4. Among the three first candidate routes R11 to R13, the routes R11 and R12 partially deviate from the second safe area SA2, but the route R13 passes within the second safe area SA2. At this time, the target motion determination unit 130 does not select the routes R11 and R12 deviating from the second safe area SA2 as the route that the motor vehicle 1 should take, but selects the route R13 as the route that the motor vehicle 1 should take.

Figure 5:
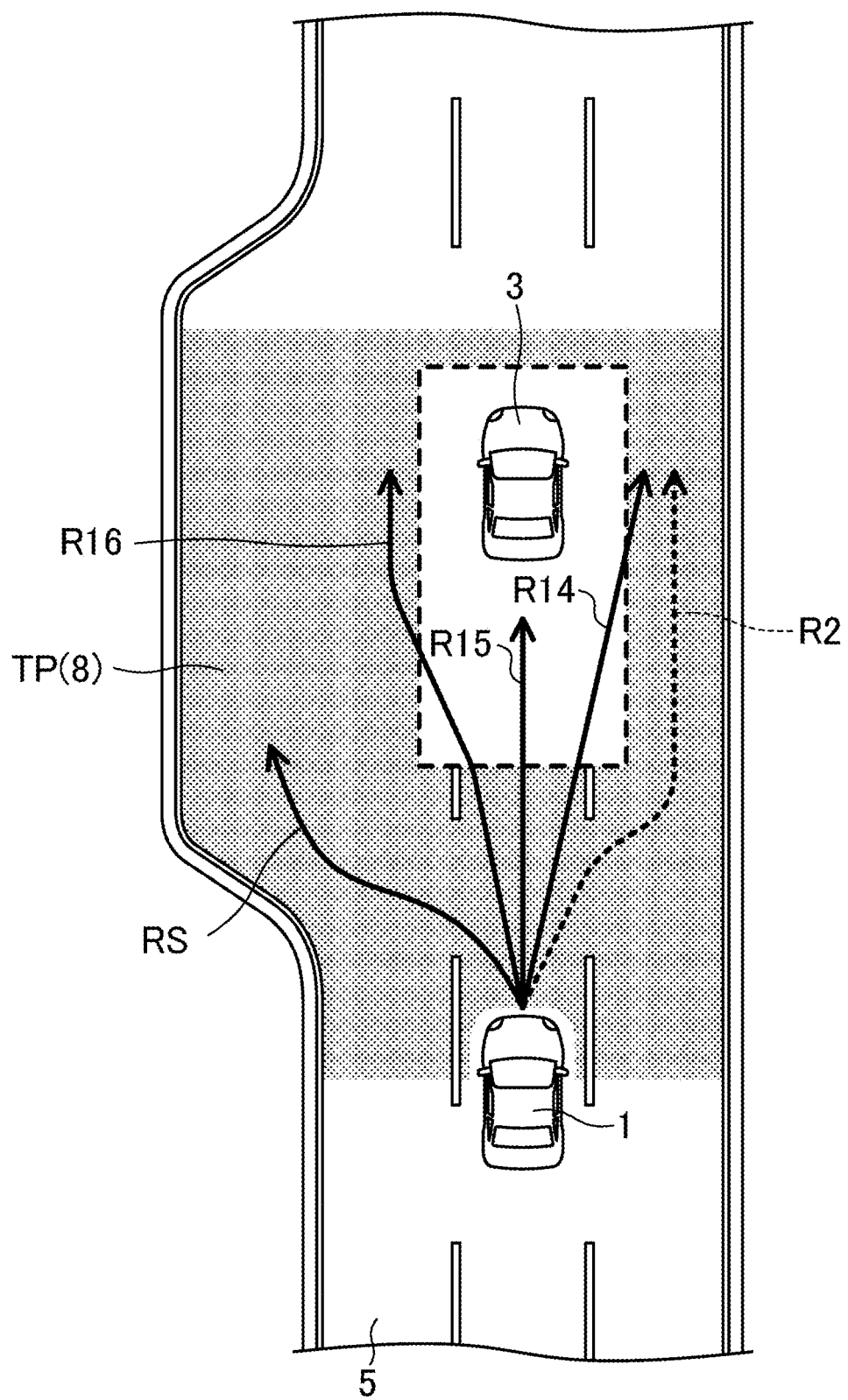
FIG. 5 is another view illustrating an example of relationship between the candidate route calculated based on the vehicle external environment estimated through deep learning and the safe area according to one or more aspects of the present disclosure.

On the other hand, provided that the first candidate routes R14, R15, and R16 are set by the first route calculation unit 113 as illustrated in FIG. 5. All the three first candidate routes R14 to R16 partially deviate from the second safe area SA2. At this time, the target motion determination unit 130 selects the second candidate route R2 having the lowest route cost among the plurality of second candidate routes calculated by the second arithmetic unit 120 as the route that the motor vehicle 1 should take.

The target object recognition unit 121 recognizes the target object based on the existing predetermined rule, and thus, can accurately recognize the size of the target object. In addition, the second safe area setting unit 122 sets the second safe area SA2 based on a predetermined rule, e.g., an area of several meters around the target object is considered as a range where the collision is unavoidable. Thus, the second candidate route is a route that can ensure a sufficient distance from the other vehicle 3 even when avoiding the collision with the other vehicle 3. Specifically, the function of the second arithmetic unit 120 can be equivalent to ASIL-D. Therefore, if all the plurality of first candidate routes R1*n* set as the candidate routes deviate from the second safe area SA2 in the calculation of the first route, the target motion determination unit 130 selects the second candidate route as the route that the motor vehicle 1 should take, so that the motor vehicle 1 can travel on a highly safe route. Accordingly, the main arithmetic device 100 having the function of using deep learning can improve the functional safety level.

—2-2. Calculation of Safe Route—

A method of calculating the safe route will be described below. As described above, the safe route is calculated by the backup arithmetic device 300.

Since the safe route is basically calculated in the same manner as the above-described second route, the differences will be mainly described below, and the description of the common configuration and operation may be omitted.

First, the setting of the grid area RW including the grid points Gn (n=1, 2, . . . , N) on the roadway 5 and the candidate route calculation processing for calculating a plurality of candidate routes can be executed by the common technique.

Then, the safe route calculation unit 313 calculates, among the candidate routes in the third safe area SA3 specified by the third safe area setting unit 312, a safe route that the motor vehicle 1 (the subject vehicle 1) should take.

As described above, the backup arithmetic device 300 sets the safe stop position TP, which is a position where the motor vehicle 1 can safely stop, and sets a travel route passing within the third safe area SA3 and heading to the safe stop position TP as the safe route RS (see FIG. 4). Therefore, in principle, the route having the lowest route cost among the candidate routes passing within the third safe area SA3 and heading to the safe stop position TP is selected as the safe route RS, and is outputted to the target motion determination unit 330.

The safe route RS outputted by the backup arithmetic device 300 is used in an abnormal situation, for example, the case where a trouble such as a failure in the main arithmetic device 100 has occurred, or the case where the driver cannot continue driving any more. Therefore, the backup arithmetic device 300 may set the safe stop position TP and/or the safe route RS in consideration of the information about abnormality.

For example, if a failure in the main arithmetic device 100 is detected and the continuation of driving may possibly be hindered, it can be determined that the vehicle should sufficiently slow down and move to a place where the vehicle can stop as soon as possible. In such a case, for example, the backup arithmetic device 300 may set the road shoulder 8 where the vehicle can safely stop at the nearest distance as the safe stop position TP as shown in FIG. 4, and set the shortest route to the road shoulder 8 as the safe route RS.

If there is no road shoulder to which the vehicle can move, hazard lamps may be turned on to warn the nearby vehicles of the abnormal state, and then the vehicle may slow down and stop in the same lane.

For example, if the driver is found to be unable to drive due to a sudden illness or the like although the subject vehicle 1 is not in failure, a hospital or a nearest public facility may be set as the safe stop position TP in cooperation with the navigation system and GPS measurement results, and the vehicle may automatically travel to the set safe stop position TP while passing within the third safe area SA3 specified at the position of the subject vehicle 1.

In this manner, the safe route calculation unit 313 may set the safe route RS while taking the abnormal state of the subject vehicle 1 and the condition of the driver into consideration.

—2-3. Processing Operation of Arithmetic System—

A processing operation of the arithmetic system SY for determining the driving route of the motor vehicle 1 will be described below with reference to the flowcharts of FIGS. 6 to 8. The motor vehicle 1 is assumed to be in the assisted driving mode or the autonomous driving mode.

Figure 6:
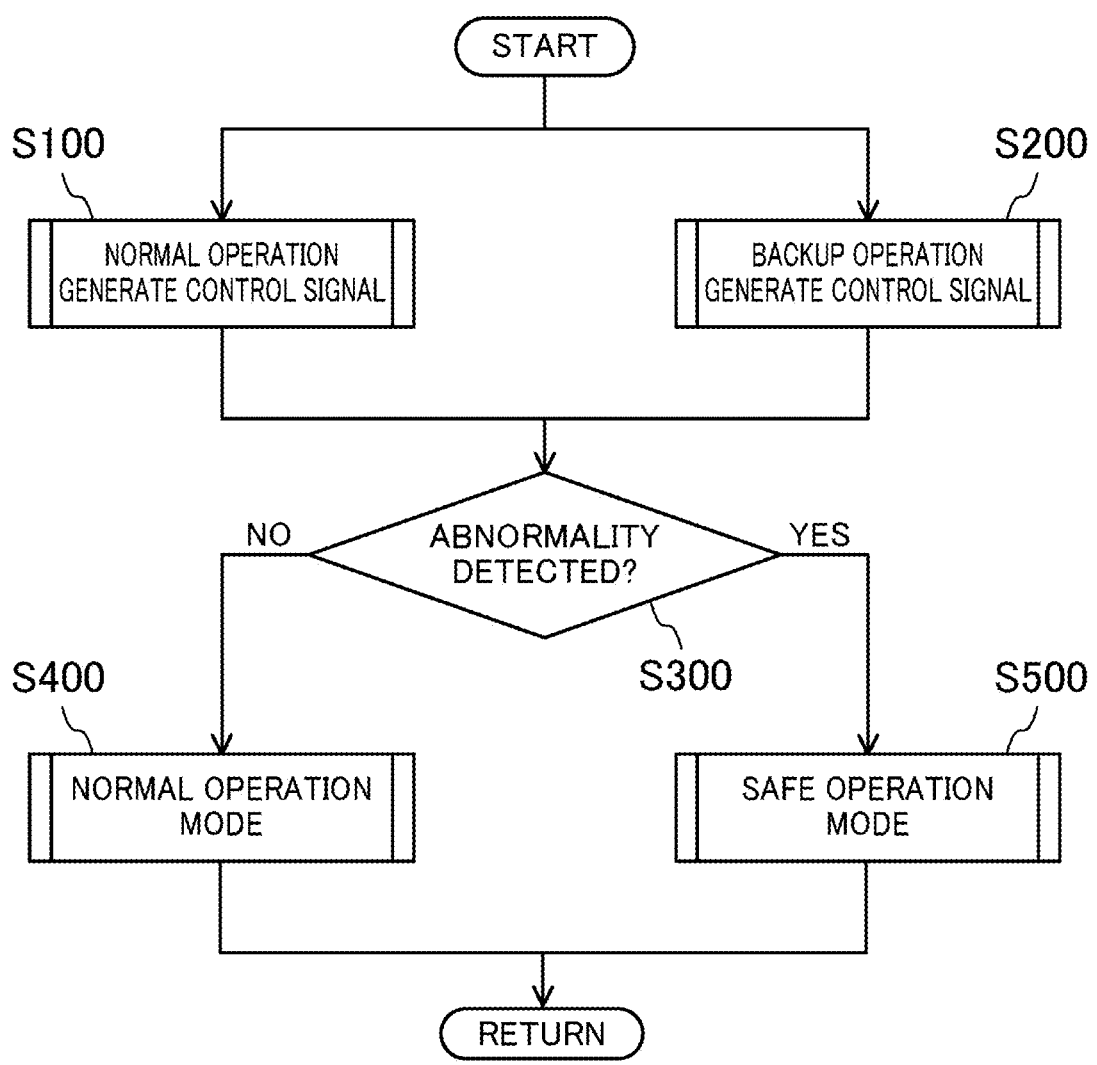
FIG. 6 is a flowchart illustrating operation processing of the arithmetic system according to one or more aspects of the present disclosure.

As shown in FIG. 6, when the arithmetic system SY starts the operation of the assisted driving or the autonomous driving, the processing by the main arithmetic device 100 (step S100) and the processing by the backup arithmetic device 300 (step S200) are executed in parallel.

(A) Processing by Main Arithmetic Device

The processing by the main arithmetic device 100 in step S100 will be described below with reference to FIG. 7.

First, in step S101, the main arithmetic device 100 reads information from the vehicle external information acquisition device M1 (the cameras 50, the radars 51, and the sensors 52 to 56).

Then, the main arithmetic device 100 (the first and second arithmetic units 110 and 120) calculates the first candidate route and the second candidate route in parallel.

In step S102, the first arithmetic unit 110 estimates the vehicle external environment using deep learning.

In the subsequent step S103, the first arithmetic unit 110 sets the first safe area SA1.

In the subsequent step S104, the first arithmetic unit 110 calculates a first candidate route using reinforcement learning, and outputs the first candidate route to the target motion determination unit 130.

In step S105, the second arithmetic unit 120 recognizes the target object based on a predetermined rule.

In step S106, the second arithmetic unit 120 sets the second safe area SA2.

In step S107, the second arithmetic unit 120 calculates a second candidate route based on a predetermined rule, and outputs the second candidate route to the target motion determination unit 130.

In the subsequent step S108, the target motion unit 130 determines whether or not the first candidate route received from the first arithmetic unit 110 is within the second safe area SA2. In this step S108, if there is a route which is entirely included in the second safe area SA2 among the first candidate routes received from the first arithmetic unit 110 (YES is selected), the flow proceeds to step S109. On the other hand, in step S108, if every first candidate route received from the first arithmetic unit 110 at least partially deviates from the second safe area SA2 (NO is selected), the flow proceeds to step S110.

In step S109, the target motion determination unit 130 selects the first candidate route as a route that the motor vehicle 1 should take. In step S110, the target motion determination unit 130 selects the second candidate route as a route that the motor vehicle 1 should take.

In the subsequent step S111, the target motion determination unit 130 calculates the target motion of the motor vehicle 1 based on the result of selection in step S109.

In the subsequent step S112, the energy management unit 140 sets the target control amount at the highest energy efficiency to achieve the target motion calculated in step S111. Specifically, for example, when outputting the required driving force determined by the target motion determination unit 130, the energy management unit 140 calculates the number of speeds of the transmission 40, the timing of opening or closing intake/exhaust valves (not shown), and the timing of injecting the fuel from injectors (not shown), so that the fuel consumption of the engine 10 is minimized. When outputting a target braking force, the energy management unit 140 generates the braking force by increasing the amount of regenerative power of the generator connected to the engine 10 or the driving load of a cooling compressor so that the operation amount of the engine brake is minimized. Further, the energy management unit 140 controls the vehicle speed and the steering angle so that the rolling resistance applied to the motor vehicle 1 during cornering is minimized. Specifically, the generation of the braking force and the timing of the steering are controlled so that rolling is induced in synchronization with pitching that lowers a front portion of the motor vehicle 1 to give rise to diagonal rolling. Giving rise to the diagonal rolling increases the load applied to the turning outer front wheel. This allows the vehicle to corner at a small steering angle, and can reduce the rolling resistance applied to the motor vehicle 1.

In the subsequent step S113, the main arithmetic device 100 controls the operation of the actuators AC so that the control amount of the actuators AC becomes the target control amount calculated in step S112. After step S113, the flow proceeds to step S300 in FIG. 6.

(B) Processing by Backup Arithmetic Device

Figure 8:
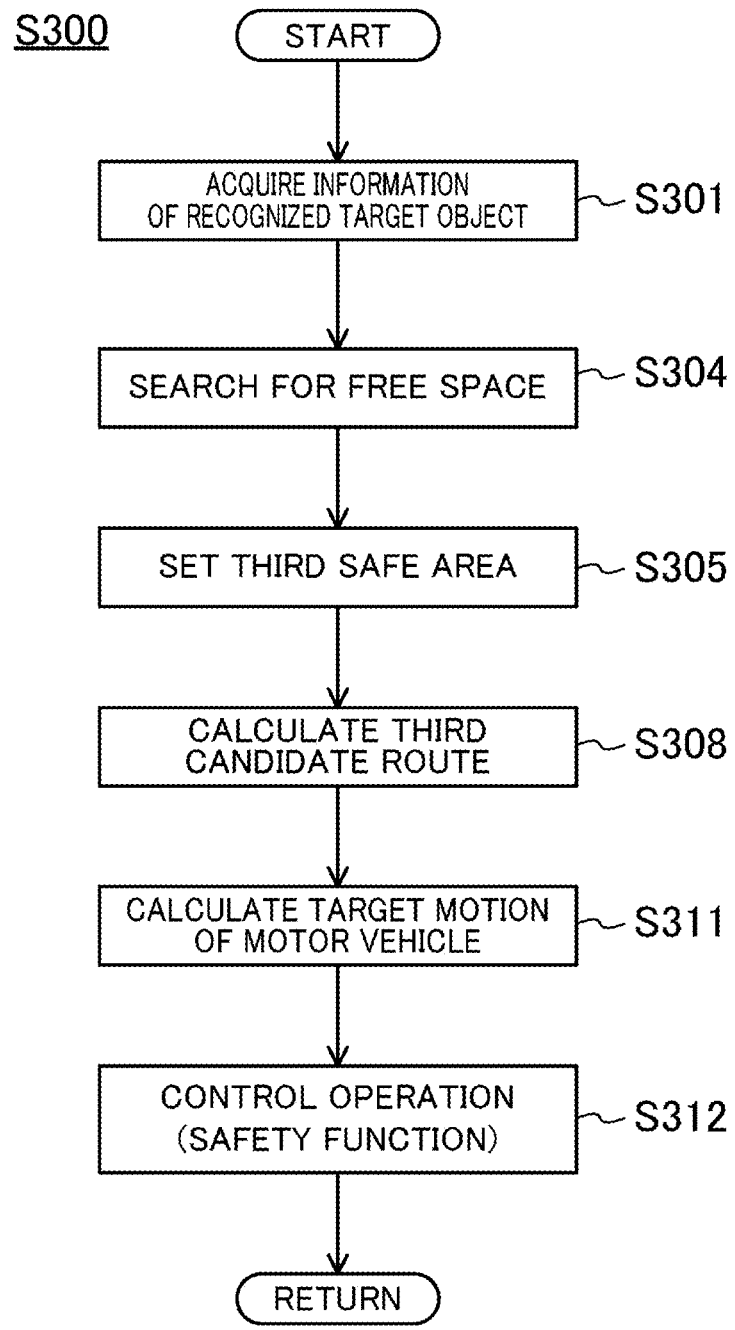
FIG. 8 is a flowchart of how a driving route of a motor vehicle is determined according to one or more aspects of the present disclosure.

Referring to FIG. 8, the processing by the backup arithmetic device 300 in step S200 will be described below.

First, in step S301, the backup arithmetic device 300 acquires information of a target object recognized based on the vehicle external information acquisition device M1 (reference character SE indicates the flow of a signal in FIG. 1). For example, the backup arithmetic device 300 acquires the information of the target object recognized by the target object recognition unit 121 of the second arithmetic unit 120. The backup arithmetic device 30 may have the function similar to that of the target object recognition unit 121 of the second arithmetic unit 120, and may acquire information of the target object recognized based on the vehicle external information acquisition device M1 by itself.

Next, in step S304, the backup arithmetic unit 310 searches for a free space where the vehicle can safely stop, and sets a safe stop position TP in the free space. Alternatively, the backup arithmetic unit 310 cooperates with GPS or the car navigation system, and acquires information of the nearest facility to be set as the safe stop position TP when the driver is in an abnormal state.

In step S305, the backup arithmetic unit 310 sets a third safe area SA3.

In the subsequent step S308, the target motion determination unit 130 selects a route within the third safe area SA3 from the safe routes received from the backup arithmetic unit 310, and sets the selected safe route as the route that the motor vehicle 1 should take.

In the subsequent step S311, the target motion determination unit 330 calculates a target motion for causing the motor vehicle 1 to travel the route selected in step S308.

In the subsequent step S312, the energy management unit 340 sets the target control amount at the highest energy efficiency to achieve the target motion calculated in step S311, and the flow proceeds to step S300 in FIG. 6.

Returning to FIG. 6, in step S300, the abnormality detection unit 450 in the arithmetic system SY determines whether the driver and/or the subject vehicle 1 are/is detected to be in an abnormal state or not.

In step S300, if no abnormality is detected by the abnormality detection unit 450 (NO is selected), the flow proceeds to "normal operation mode" in step S400. In the "normal operation mode" in step S400, the selector circuit 500 selects and outputs the control signal for realizing the target motion output from the main arithmetic device.

If the abnormality detection unit 450 has detected an abnormality in step S300 (YES is selected), the flow proceeds to a safe operation mode in step S500. In the "normal" operation mode in step S400, the selector circuit 500 selects and outputs the control signal for realizing the target motion output from the main arithmetic device.

In summary, the automotive arithmetic system SY mounted on the motor vehicle 1 includes the main arithmetic device 100, the backup arithmetic device 300, and the selector circuit 500. The main arithmetic device 100 includes the first route calculation unit 113 (corresponding to a route generation unit) that estimates the vehicle external environment using deep learning based on the output from the vehicle external information acquisition device M1 that acquires information of the vehicle external environment, and generates the first route based on the estimated vehicle external environment. The main arithmetic device 100 determines a target motion using the output of the first route calculation unit 113, and outputs a control signal for achieving the target motion. The backup arithmetic device 300 includes the safe route calculation unit 313 (corresponding to a safe route generation unit) that generates a safe route, which is a travel route on which the vehicle travels to the safe stop position TP where the vehicle can safely stop, based on the output from the vehicle external information acquisition device M1. The backup arithmetic device 300 determines a backup target motion for causing the vehicle to travel on the safe route, and outputs a backup control signal for achieving the backup target motion. The selector circuit 500 receives the control signal outputted from the main arithmetic device 100 and the backup control signal outputted from the backup arithmetic device 300, selects and outputs the control signal outputted from the main arithmetic device 100 during the normal operation, or selects and outputs the backup control signal outputted from the backup arithmetic device 300 when a failure of the main arithmetic device 100 is detected.

According to this configuration, the main arithmetic device 100 having the function of using deep learning can improve the functional safety level.

Second Embodiment

FIG. 10 illustrates a configuration of an automotive arithmetic system SY (may be hereinafter simply referred to as an "arithmetic system SY") according to a second embodiment. In FIG. 10, components that are common with those shown in FIG. 1 are denoted by the same reference numerals, and may not be described in detail.

As shown in FIG. 10, the arithmetic system SY includes a main arithmetic device 100, a backup arithmetic device 300, and an override processing unit 410. In the exemplary configuration of FIG. 11, the arithmetic system SY includes a processor SY2 and a memory SY4. The memory SY4 stores modules each of which is a software program executable by the processor SY2. The function of each unit of the arithmetic system SY shown in FIG. 10 is achieved, for example, by the processor SY2 executing the modules stored in the memory SY4. In addition, the memory SY4 stores data of a model used by the arithmetic system SY. Note that a plurality of processors SY2 and a plurality of memories SY4 may be provided.

The main arithmetic device 100 includes a first arithmetic unit 110 and a second arithmetic unit 120.

The first arithmetic unit 110 (corresponding to a main arithmetic unit) has the function of estimating the vehicle external environment including a road and an obstacle using deep learning, and generating a first route that is a travel route of the motor vehicle based on the estimated vehicle external environment. Note that the specific configuration and operation of the first arithmetic unit 110 are the same as those of the first embodiment, and will not be described in detail below. The first candidate route (corresponding to a travel route of the motor vehicle) generated by the first route calculation unit 113 of the first arithmetic unit 110 is outputted to the override processing unit 410.

The second arithmetic unit 120 (corresponding to an auxiliary arithmetic unit) has the function of estimating the presence of the road and the obstacle based on the output from the vehicle external information acquisition device M1 (e.g., the cameras 50 and the radars 51) according to a predetermined rule, which is preset, without using deep learning, and generating a rule-based travel route in a free space on the road where no obstacle is present. Note that the specific configuration and operation of the second arithmetic unit 120 are the same as those of the first embodiment, and will not be described in detail below. The second candidate route generated by the second route calculation unit 123 of the second arithmetic unit 120 is outputted to the override processing unit 410.

The backup arithmetic device 300 (corresponding to a safe route generation unit) has the function of generating a safe route, which is a travel route that the motor vehicle takes until the motor vehicle stops at a safe stop position that satisfies a preset criterion, based on the output from the vehicle external information acquisition device M1 without using deep learning. Note that the specific configuration and operation of the backup arithmetic device 300 are the same as those of the first embodiment, and will not be described in detail below. The safe route RS generated by the safe route calculation unit 313 of the backup arithmetic device 300 is outputted to the override processing unit 410.

The override processing unit 410 includes an override unit 420, a target motion determination unit 130, and an energy management unit 140.

The override unit 420 receives the first candidate route generated by the first route calculation unit 113, the second candidate route generated by the second route calculation unit 123, and the safe route RS generated by the safe route calculation unit 313, prioritizes one of the routes over the others, and outputs the prioritized route.

For example, the override unit 420 receives the output from the vehicle internal information acquisition device M2 and determines the route to be prioritized, based on the output. More specifically, the override unit 420 may prioritize the safe route RS generated by the safe route calculation unit 313 if the vehicle is determined to have failed based on the state of the vehicle received from the vehicle internal information acquisition device M2 (e.g., the measurement result of the in-vehicle sensor). Alternatively, the override unit 420 may prioritize the safe route RS if the driver's driving ability is determined to have decreased based on the state of the vehicle received from the vehicle internal information acquisition device M2. Specific examples of the operation of the override unit 420 will be described later with reference to FIGS. 12A and 12B.

The target motion determination unit 130 receives the output from the override unit 420, and determines the target motion of the motor vehicle 1. In the same manner as described in the first embodiment, the target motion determination unit 130 sets a route that the motor vehicle 1 should take, and determines the operation amount required for the actuators AC to cause the motor vehicle 1 to travel on the route.

The energy management unit 140 calculates the amount of control of the actuators AC at the highest energy efficiency to achieve the target motion determined by the target motion determination unit 130. An operation example of the energy management unit 140 will be described more specifically in the following section of "Example Introduced to Actual System."p Data of the target motion determined by the target motion determination unit 130 and data of the control amount calculated by the energy management unit 140 are outputted to the actuators AC as control signals for controlling the actuators AC.

When the override unit 420 outputs the safe route RS as the prioritized route, the override processing unit 410 may cause at least one of a lighting device 41, a sounding device 42, or a wireless communication device 43 mounted on the motor vehicle to operate in a mode different from a predetermined normal traveling mode. For example, when the override unit 420 outputs the safe route RS as the prioritized route, the motor vehicle may immediately decelerate to a slow speed level, while flashing the lighting device 41 and blowing a horn as the sounding device 42. Further, the wireless communication device 43 configured to be able to communicate with the outside may inform a medical emergency facility or an administrative server of an event occurring in the vehicle (e.g., the state of a vehicle failure and the condition of the driver).

Figure 12B:
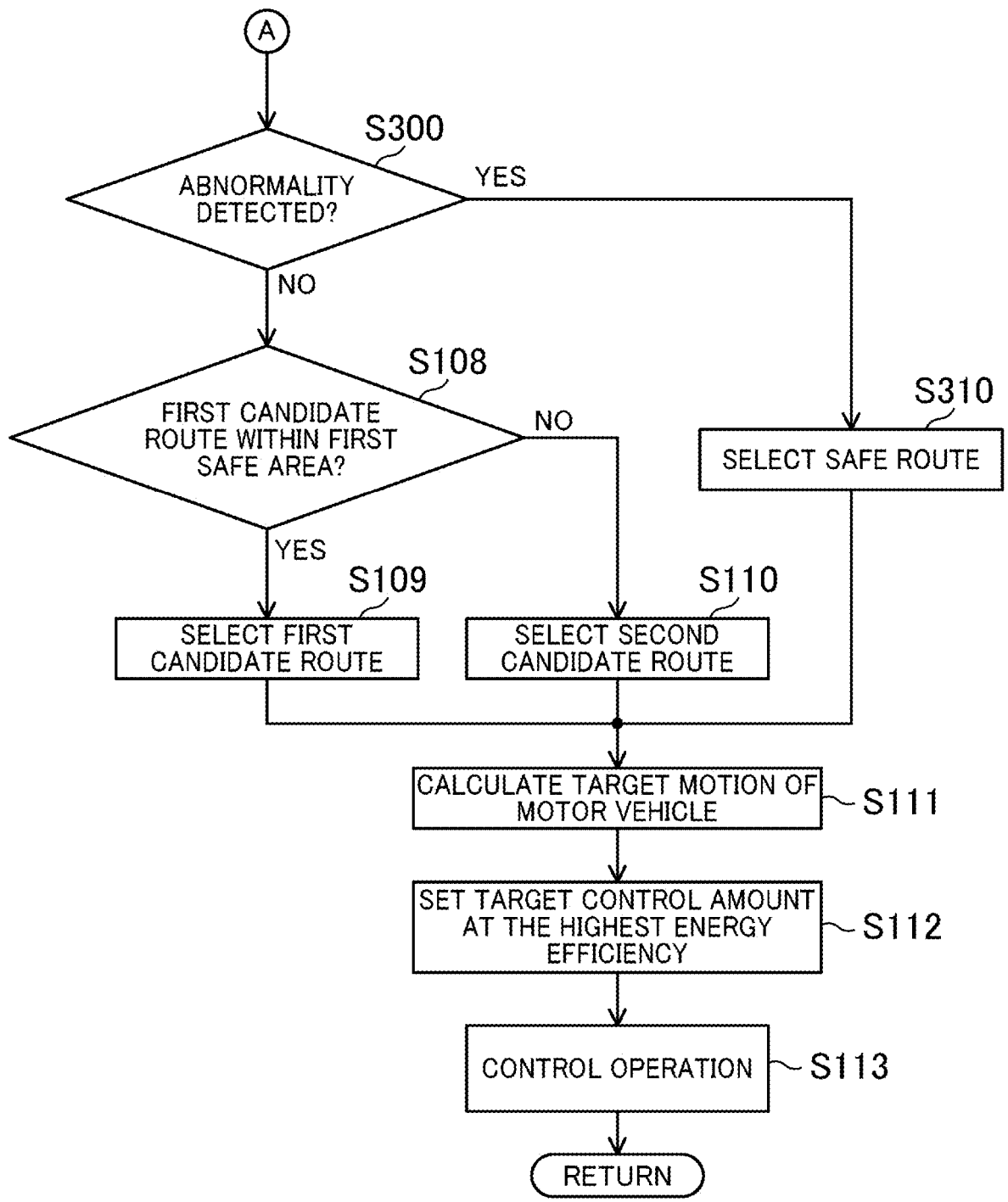
FIG. 12B is a flowchart illustrating operation processing of the arithmetic system of the second embodiment according to one or more aspects of the present disclosure.

A processing operation of the arithmetic system SY for determining the driving route of the motor vehicle 1 will be described below with reference to the flowcharts of FIGS. 12A and 12B. The motor vehicle 1 is assumed to be in the assisted driving mode or the autonomous driving mode. In the following description, FIGS. 12A and 12B are collectively referred to as FIG. 12. In FIG. 12, operations that are common with those shown in FIGS. 6 to 8 are denoted by the same reference numerals, and may not be described in detail.

As shown in FIG. 12, in step S101, the main arithmetic device 100 reads information from the vehicle external information acquisition device M1 (the cameras 50, the radars 51, and the sensors 52 to 56).

Figure 7:
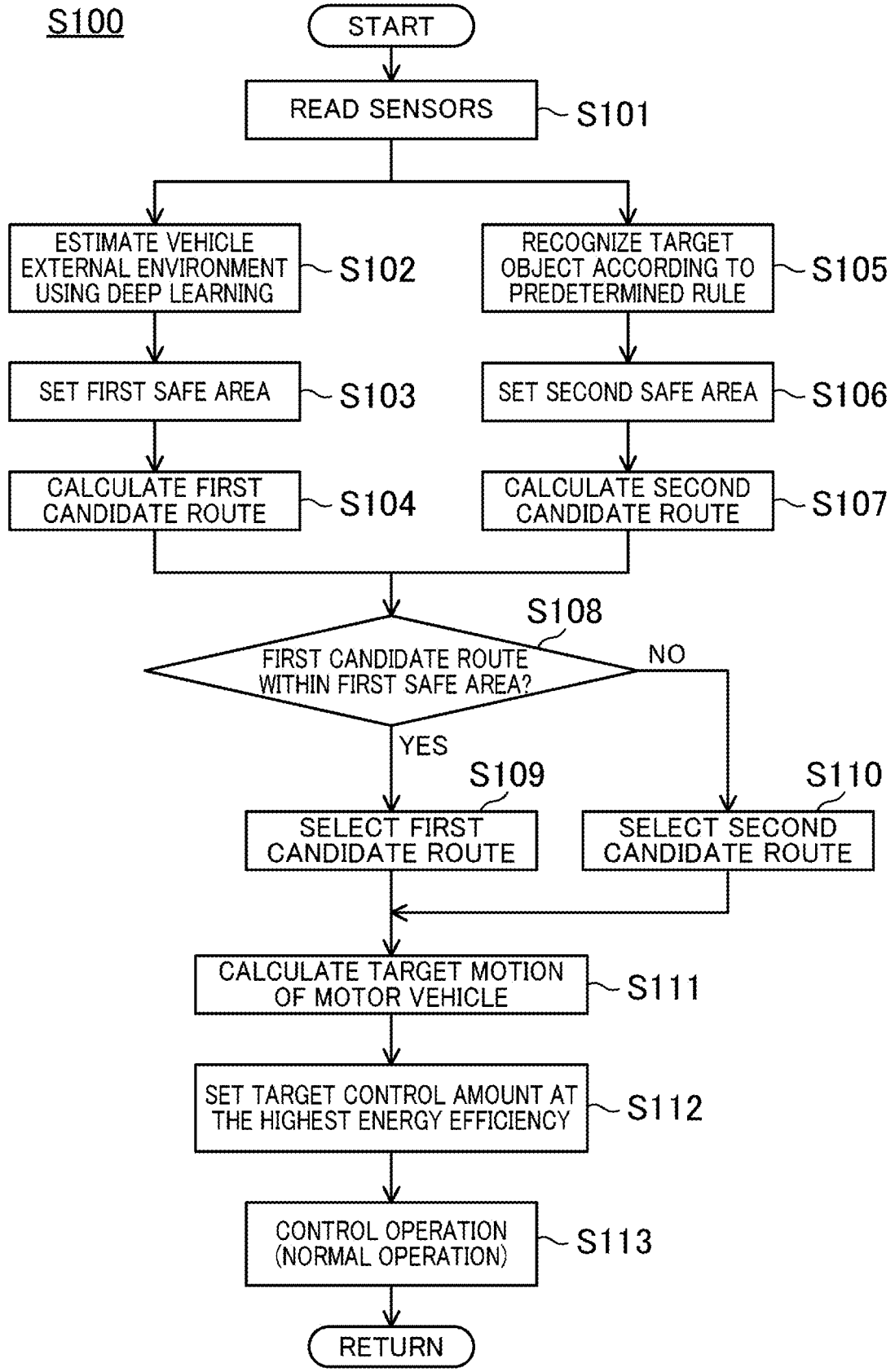
FIG. 7 is a flowchart of how a driving route of a motor vehicle is determined according to one or more aspects of the present disclosure.

Steps S102 to S104 are a series of processing performed by the first arithmetic unit 110, and are the same as those shown in FIG. 7. Steps S105 to S107 are a series of processing performed by the second arithmetic unit 120, and are the same as those shown in FIG. 7.

The information of the target object recognized by the target object recognition unit 121 of the second arithmetic unit 120 in step S105 is outputted to the backup arithmetic unit 310.

The backup arithmetic unit 310 performs the same processing as that shown in FIG. 7 as steps S304, S305, and S308 based on the information of the target object received from the target object recognition unit 121.

In the subsequent step S300, the arithmetic system SY determines whether the driver and/or the subject vehicle 1 are/is detected to be in an abnormal state or not. In the subsequent step S108, the arithmetic system SY determines whether the first candidate route received from the first arithmetic unit 110 is within the second safe area SA2 or not. Based on the results of the determination in the two steps, the override unit 420 prioritizes one of (1) the first candidate route generated by the first route calculation unit 113, (2) the second candidate route generated by the second route calculation unit 123, or (3) the safe route RS generated by the safe route calculation unit 313, and outputs the prioritized route.

Specifically, if at least one of a vehicle failure or a decrease in the driving ability of the driver is detected from the output of the vehicle internal information acquisition device M2 in step S300 (YES is selected), the override unit 420 selects the safe route RS (described as a third candidate route in FIG. 12B) generated by the safe route calculation unit 313 (step S310).

If no abnormality is detected in the output of the vehicle internal information acquisition device M2 (NO is selected), the flow proceeds to step S108.

In step S108, if there is a route which is entirely included in the second safe area SA2 among the first candidate routes received from the first arithmetic unit 110 (YES is selected), the override unit 420 selects and outputs one of the first candidate routes generated by the first route calculation unit 113 (step S109). On the other hand, in step S108, if every first candidate route received from the first arithmetic unit 110 at least partially deviates from the second safe area SA2 (NO is selected), the override unit 420 selects and outputs one of the second candidate routes generated by the second route calculation unit 123 (step S110).

In the subsequent step S111, the target motion determination unit 130 calculates the target motion of the motor vehicle 1.

In the subsequent step S112, the energy management unit 140 sets the target control amount at the highest energy efficiency to achieve the target motion calculated in step S111 in the same manner as described in the first embodiment.

In the subsequent step S113, the main arithmetic device 100 controls the operation of the actuators AC so that the control amount of the actuators AC becomes the target control amount calculated in step S112.

Thus, according to the present embodiment, the main arithmetic device 100 having the function of using deep learning can improve the functional safety level.

Other Embodiments

The foregoing embodiments are merely preferred examples in nature, and the scope of the present disclosure should not be interpreted in a limited manner. The scope of the present disclosure should be defined by the appended claims, and all the modifications and changes which fall within the scope of equivalents of the appended claims are within the scope of the present disclosure. That is, the present disclosure is not limited to the embodiments described above, and any change can be made within the scope of the claims as appropriate.

For example, it has been described in the first and second embodiments that the energy management unit 140 sets the target control amount at the highest energy efficiency to achieve the target motion after the target motion determination unit 130 has determined the target motion. However, the present disclosure is not limited thereto, and the energy management unit 140 may be omitted. Specifically, the target motion determination unit 130 may set the target control amount for achieving the target motion.

It has been described in the embodiments that the main arithmetic device 100 and the backup arithmetic device 300 are configured of different chips, for example, but the present disclosure is not limited thereto. For example, the main arithmetic device and the backup arithmetic device may be physically separated from each other and housed in the same housing or package.

In addition, the abnormality detection unit 450 may be configured to detect an abnormality in the output itself of the vehicle external information acquisition device M1 or the output itself of the vehicle internal information acquisition device M2. For example, the abnormality detection unit 450 may be configured to be able to detect a state where a problem has occurred in the route generation by the main arithmetic device 100, such as when the camera 50 has failed or no signals are inputted from the camera 50. The selector circuit 500 may be configured to select and output the backup control signal outputted from the backup arithmetic device 300 when the abnormality detection unit 450 has detected an abnormality in the output of the vehicle external information acquisition device M1 such as the camera 50.

It has been described in the embodiments that the selector circuit 500 is provided, but the present disclosure is not limited thereto. For example, the detection result of the abnormality detection unit 450 may be given to both of the main arithmetic device 100 and the backup arithmetic device 300. During the normal operation, the backup arithmetic device 300 stops outputting, and the main arithmetic device 100 outputs the control signal to the actuators AC. On the other hand, if a failure of the main arithmetic device is detected, the main arithmetic device 100 may stop outputting, and the backup arithmetic device 300 may output the backup control signal to the actuators AC.

Moreover, information of the safe area set by the second safe area setting unit 122 of the second arithmetic unit 120 may be given to the first route generation unit 705 of the first arithmetic unit 110. Then, the first route calculation unit 113 of the first arithmetic unit 110 may set the first route in consideration of the safe area set by the second safe area setting unit 122.

(Example Introduced to Actual System)

Figure 9A:
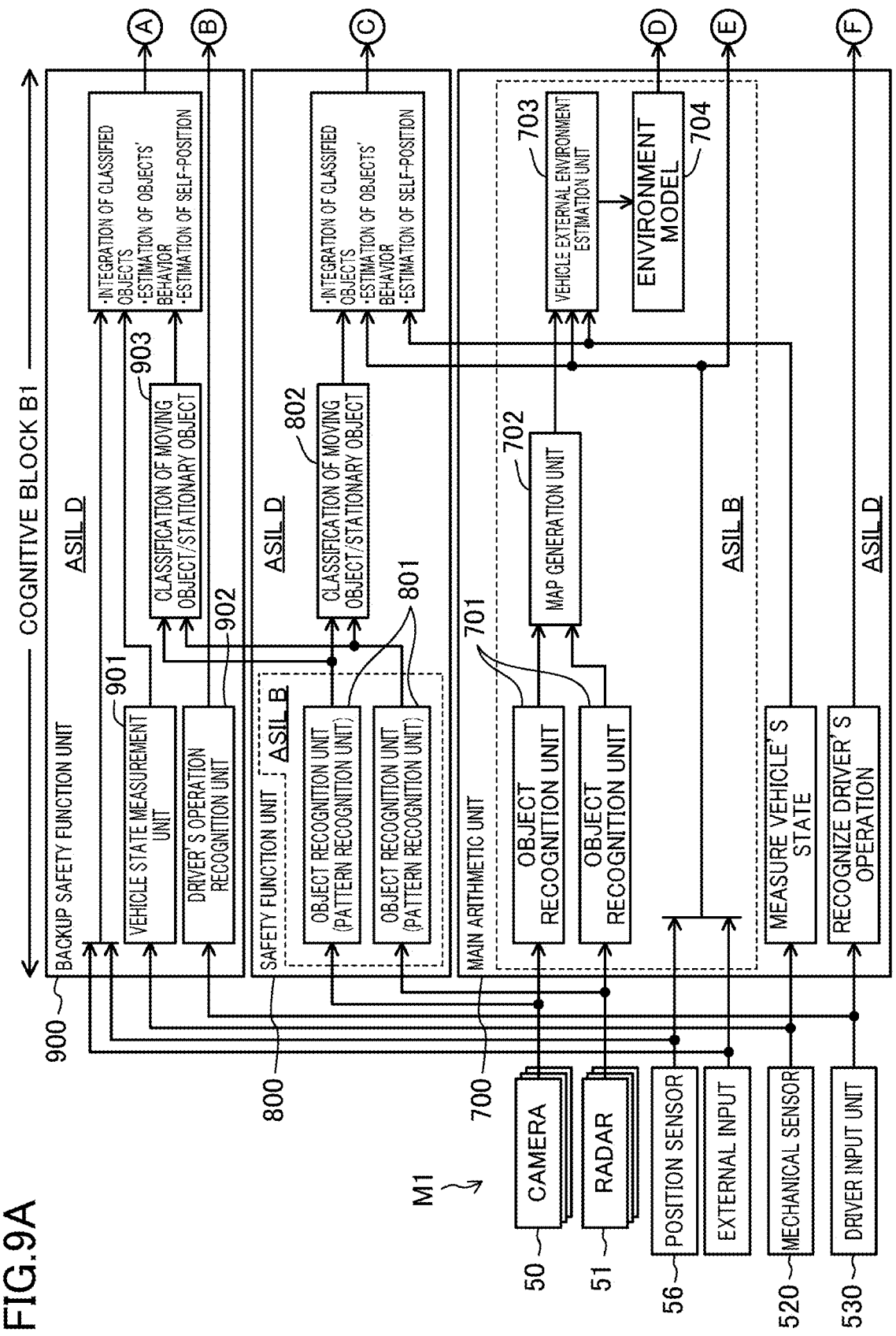
FIG. 9A is a block diagram illustrating a functional configuration of an example introduced into an actual system according to one or more aspects of the present disclosure.
Figure 9B:
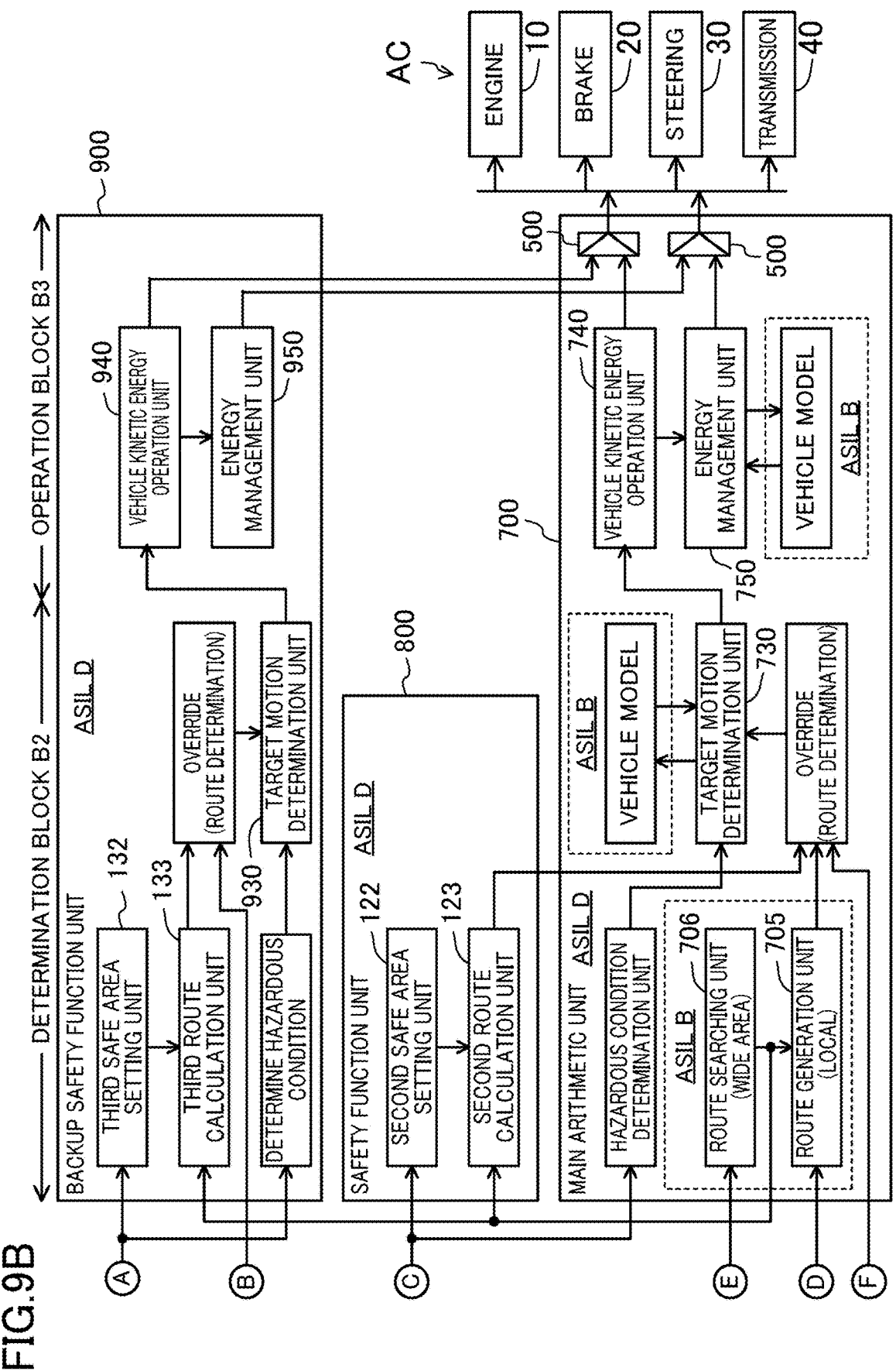
FIG. 9B is a block diagram illustrating a functional configuration of an example introduced into an actual system according to one or more aspects of the present disclosure.

An example introduced into an actual system will be described below with reference to FIGS. 9A and 9B. In the following description, FIGS. 9A and 9B are collectively referred to as FIG. 9.

—1. Outline—

First, the automotive arithmetic system SY of the present disclosure (will be hereinafter simply referred to as an "arithmetic system SY") is functionally divided into: (1) a configuration (may be hereinafter referred to as a "cognitive block B1") for recognizing the vehicle external environment and the vehicle internal environment (including the driver's condition); (2) a configuration (may be hereinafter referred to as a "determination block B2") for considering various states and situations based on the recognition result of the cognitive block B1 and determining the operation of the motor vehicle 1; and (3) a configuration (may be hereinafter referred to as an "operation block B3") for specifically generating signals and data to be transmitted to the actuators based on the determination in the determination block B2. One of the features of the present disclosure is that the cognitive block B1, the determination block B2, and the operation block B3 are integrated and realized into a single unit.

The arithmetic system SY includes: (1) a main arithmetic unit 700 including the cognitive block B1, the determination block B2, and the operation block B3 for realizing autonomous driving during the normal operation; (2) a safety function unit 800 that mainly functions to complement the cognitive block B1 and determination block B2 of the main arithmetic unit 700; and (3) a backup safety function unit 900 that causes the motor vehicle 1 to move to a safe position when an abnormal situation has occurred, such as a failure in the functions of the main arithmetic unit 700 and the safety function unit 800.

In the arithmetic system SY, the cognitive block B1 and determination block B2 of the main arithmetic unit 700 execute processing using various models constructed through deep learning using a neural network. The processing using such models enables driving control based on comprehensive determination of the state of the vehicle, the vehicle external environment, and the conditions of the driver, i.e., control of a large amount of input information in cooperation in real time. However, as described above, the recognition of the vehicle external environment and the route calculation using the deep learning are still under development, and considered to remain at around ASIL-B. Although ASIL information of each block is described as reference information in FIG. 9, the present disclosure is not limited thereto, and each block may have a functional safety level different from that shown in FIG. 9.

Thus, the arithmetic system SY of the present disclosure assumes that the deep learning executed by the main arithmetic unit 700 may possibly lead to determination or processing deviating from a certain acceptable range (hereinafter simply referred to as "deviating processing"), and monitors the deviating processing. If the deviating processing is detected, the deviating processing is replaced or complemented with determination or processing by the safety function unit 800 having the functional safety level equivalent to ASIL-D.

Specifically, for example, the safety function unit 800 is configured to: (1) recognize an object outside of the vehicle (referred to as a "target object" in the present disclosure) based on a target recognition method which has been adopted to the motor vehicles; and (2) set a safe area which the vehicle can safely pass by a method that has been adopted to the motor vehicles, and then set a route passing the safe area as a travel route that the motor vehicle should take. Through the so-called rule-based determination and processing, a functional safety level equivalent to ASIL-D can be realized.

Another feature of the arithmetic system SY is that the main arithmetic unit 700 and the safety function unit 800 perform processing for the same purpose (e.g., route generation) in parallel based on the same input information (including information acquired by the vehicle external information acquisition device M1 and the vehicle internal information acquisition device M2). This configuration makes it possible to monitor the deviating processing that is derived from the main arithmetic unit 700, and employ the determination or processing by the safety function unit 800, or cause the main arithmetic unit 700 to re-calculate, as necessary.

The main arithmetic unit 700 and the safety function unit 800 may be configured as one or more chips in which their functions are combined together (hereinafter, the combination may also be referred to as a "vehicle control function"), or the main arithmetic unit 700 and the safety function unit 800 may be configured as independent chips.

As an example of how to address the deviating processing by the main arithmetic unit 700, it has been described in the embodiments that a route, which is set by the main arithmetic unit 700 and deviates from the safe area set by the safety function unit 800, is replaced with a rule-based route generated by the safety function unit 800.

Further, the arithmetic system SY is provided with a backup safety function unit 900 (corresponding to the backup arithmetic device 30) to be able to address a situation in which both of the main arithmetic unit 700 and the safety function unit 800 fail. The backup safety function unit 900 has the function of generating a rule-based route based on the information outside the vehicle and executing the vehicle control until the vehicle stops at a safe position, as a separate configuration from the main arithmetic unit 700 and the safety function unit 800. Thus, in one preferred embodiment, the main arithmetic unit 700 and the safety function unit 800 are configured as separate devices (chips).

Therefore, for example, even when the main arithmetic unit 700 and the safety function unit 800 are configured as a common chip and a failure occurs in the chip itself, the vehicle can stop at a safe place. In other words, the provision of the backup safety function unit 900 makes it possible to complement the failure of one of the vehicle control function or the backup function by the other, and secure the safety operation at the time of failure.

—2. Configuration—

A specific configuration of the arithmetic system SY will be described below with reference to FIG. 9 in comparison with the embodiments. Note that configurations common to the embodiments may be described using common reference numerals. Further, detailed description of the common configurations may be omitted.

The arithmetic system SY receives, as input signals, data acquired by the vehicle external information acquisition device M1 that acquires the information of the environment outside the motor vehicle, and data acquired by the vehicle internal information acquisition device M2 that acquires the information on the environment inside the motor vehicle. The arithmetic system SY may receive, as the input signal, information inputted from a system or a service connected to an external network (e.g., the Internet), such as the cloud computing (referred to as "EXTERNAL INPUT" in FIG. 9).

Examples of the vehicle external information acquisition device M1 include (1) a plurality of cameras 50, (2) a plurality of radars 51, (3) a mechanical sensor 520 such as a vehicle speed sensor 52, (4) a driver input unit 530 such as an accelerator position sensor 53, a steering angle sensor 54, and a brake sensor 55, and (5) a position sensor 56 including a positioning system such as GPS.

Examples of the vehicle internal information acquisition device M2 include an in-vehicle camera 58 and an in-vehicle sensor 59. The in-vehicle sensor 59 includes, for example, a sensor that detects a driver's operation of various operation objects such as an accelerator pedal, a brake pedal, a steering wheel, and various switches. The vehicle internal information acquisition device M2 is not shown in FIG. 9.

—2-1. Main Arithmetic Unit—

A configuration example of the main arithmetic unit 700 and the route generation using deep learning by the main arithmetic unit 700 will be described below.

As shown in FIG. 9, the main arithmetic unit 700 includes an object recognition unit 701 that recognizes an object (target object) outside the vehicle based on the input from the cameras 50 and/or the radars 51. The object recognition unit 701 has the function of recognizing an object outside the vehicle based on an image (including video) of the outside the vehicle taken by the cameras 50 and/or on a peak list of reflected waves using the radars 51. As described in the embodiment, the main arithmetic unit 700 has the function of determining what the recognized object is using deep learning. A known object recognition technique based on an image or radio waves can be applied to the object recognition unit 701. Non-limiting examples of different approaches for developing the trained models is described with respect to FIGS. 5 and 13-16, discussed below.

In a non-limiting example, a process is described about how a learned model is trained, according to the present teachings. The example will be in the context of a vehicle external environment estimation circuitry (e.g., a trained model saved in a memory and applied by a computer). However, other aspects of the trained model for controlling steering, braking, etc., are implemented in similar processes. Hereinafter, as part of a process for determining how a computing device 1000 calculates a route path (R2, R13, R12, R11, or RS for example on a road 5 illustrated in FIG. 4) in the presence of an obstacle 3 (another vehicle) surrounded by a protection zone (see dashed line that encloses unshaded area) will be explained. In this example, the obstacle 3 is a physical vehicle that has been captured by a forward-looking camera from the trailing vehicle 1. The model can be hosted in a single information processing unit (or single information processing circuitry).

Figure 13:
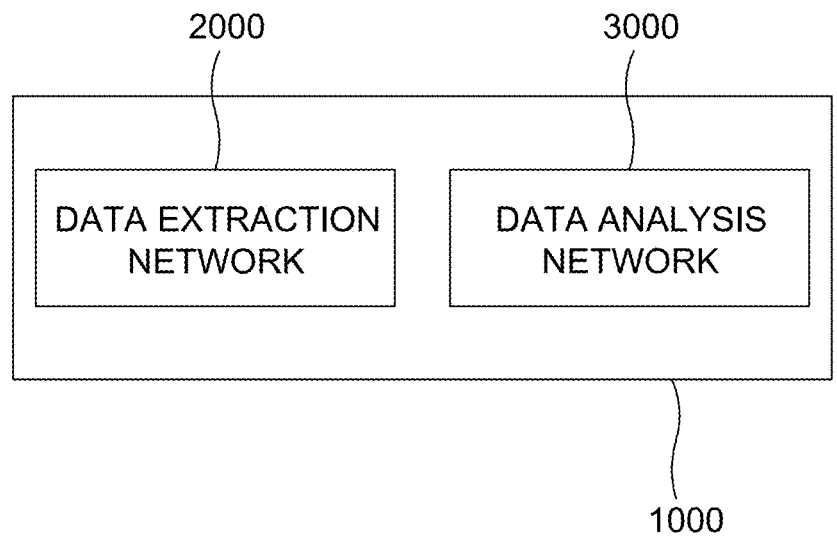
FIG. 13 is a diagram of an AI-based computer architecture according to one or more aspects of the present disclosure.

First, by referring to FIG. 13, a configuration of the computing device 1000 will be explained.

The computing device 1000 may include a data extraction network 2000 and a data analysis network 3000. Further, to be illustrated in FIG. 14, the data extraction network 2000 may include at least one first feature extracting layer 2100, at least one Region-Of-Interest (ROI) pooling layer 2200, at least one first outputting layer 2300 and at least one data vectorizing layer 2400. And, also to be illustrated in FIG. 13, the data analysis network 3000 may include at least one second feature extracting layer 3100 and at least one second outputting layer 3200.

Below, an aspect of calculating a safe route (e.g. R13), around a protection zone that surrounds the obstacle will be explained. Moreover, the specific aspect is to learn a model to detect obstacles (e.g., vehicle 1) on a roadway, and also estimate relative distance to a superimposed protection range that has been electronically superimposed about the vehicle 3 in the image. To begin with, a first example of the present disclosure will be presented.

First, the computing device 1000 may acquire at least one subject image that includes a superimposed protection zone about the subject vehicle 3. By referring to FIG. 4, the subject image may correspond to a scene of a highway, photographed from a vehicle 1 that is approaching another vehicle 3 from behind on a three-lane highway.

After the subject image is acquired, in order to generate a source vector to be inputted to the data analysis network 3000, the computing device 1000 may instruct the data extraction network 2000 to generate the source vector including (i) an apparent distance, which is a distance from a front of vehicle 1 to a back of the protection zone surrounding vehicle 3, and (ii) an apparent size, which is a size of the protection zone.

In order to generate the source vector, the computing device 1000 may instruct at least part of the data extraction network 2000 to detect the obstacle 3 (vehicle) and protection zone. Specifically, the computing device 1000 may instruct the first feature extracting layer 2100 to apply at least one first convolutional operation to the subject image, to thereby generate at least one subject feature map. Thereafter, the computing device 1000 may instruct the ROI pooling layer 2200 to generate one or more ROI-Pooled feature maps by pooling regions on the subject feature map, corresponding to ROIs on the subject image which have been acquired from a Region Proposal Network (RPN) interworking with the data extraction network 2000. And, the computing device 1000 may instruct the first outputting layer 2300 to generate at least one estimated obstacle location and one estimated protection zone region. That is, the first outputting layer 2300 may perform a classification and a regression on the subject image, by applying at least one first Fully-Connected (FC) operation to the ROI-Pooled feature maps, to generate each of the estimated obstacle location and protection zone region, including information on coordinates of each of bounding boxes. Herein, the bounding boxes may include the obstacle and a region around the obstacle (protection zone).

After such detecting processes are completed, by using the estimated obstacle location and the estimated protection zone location, the computing device 1000 may instruct the data vectorizing layer 2400 to subtract a y-axis coordinate (distance in this case) of an upper bound of the obstacle from a y-axis coordinate of the closer boundary of the protection zone to generate the apparent distance, and multiply a distance of the protection zone and a horizontal width of the protection zone to generate the apparent size of the protection zone.

After the apparent distance and the apparent size are acquired, the computing device 1000 may instruct the data vectorizing layer 2400 to generate at least one source vector including the apparent distance and the apparent size as its at least part of components.

Then, the computing device 1000 may instruct the data analysis network 3000 to calculate an estimated actual protection zone by using the source vector. Herein, the second feature extracting layer 3100 of the data analysis network 3000 may apply second convolutional operation to the source vector to generate at least one source feature map, and the second outputting layer 3200 of the data analysis network 3000 may perform a regression, by applying at least one FC operation to the source feature map, to thereby calculate the estimated protection zone.

As shown above, the computing device 1000 may include two neural networks, i.e., the data extraction network 2000 and the data analysis network 3000. The two neural networks should be trained to perform the processes properly, and thus below it is described how to train the two neural networks by referring to FIG. 14 and FIG. 15.

Figure 14:
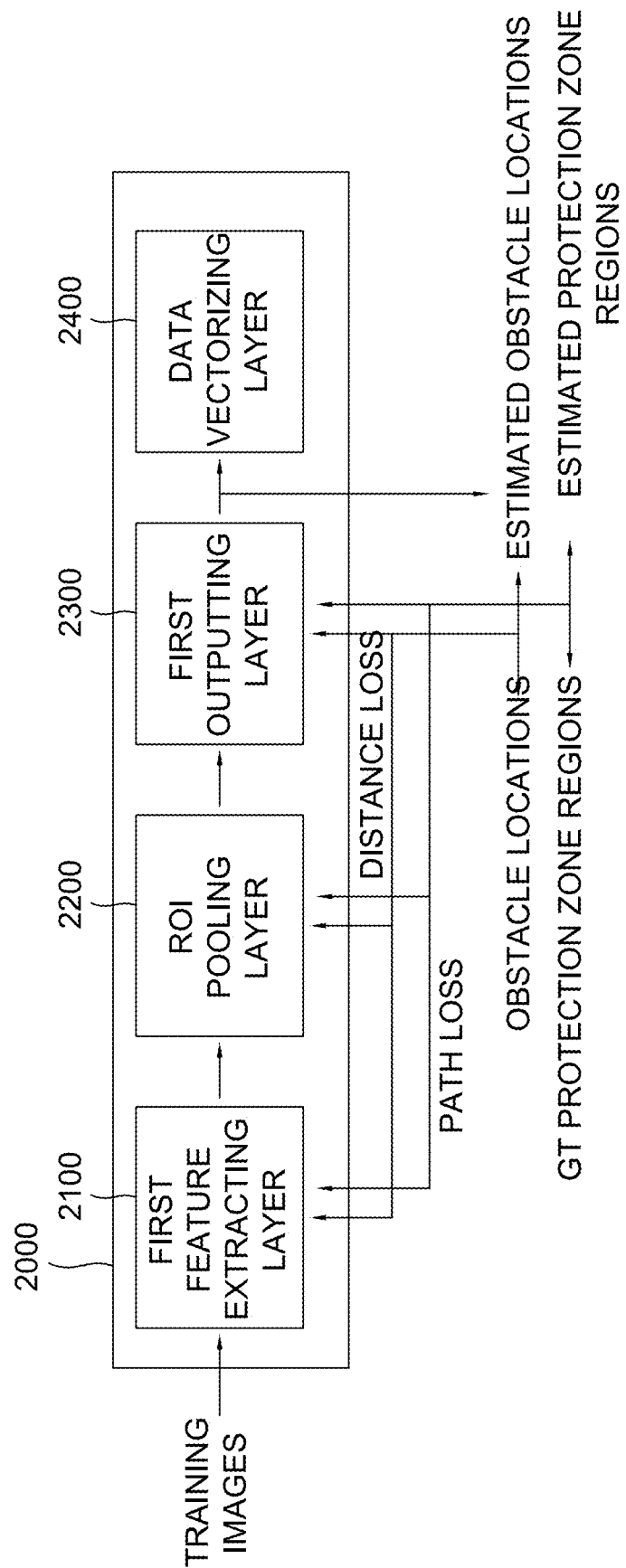
FIG. 14 is a diagram of a data extraction network according to one or more aspects of the present disclosure.

First, by referring to FIG. 14, the data extraction network 2000 may have been trained by using (i) a plurality of training images corresponding to scenes of subject roadway conditions for training, photographed from fronts of the subject vehicles for training, including images of their corresponding projected protection zones (protection zones superimposed around a forward vehicle, which is an "obstacle" on a roadway) for training and images of their corresponding grounds for training, and (ii) a plurality of their corresponding GT obstacle locations and GT protection zone regions. The protection zones do not occur naturally, but are previously superimposed about the vehicle 3 via another process, perhaps a bounding box by the camera. More specifically, the data extraction network 2000 may have applied aforementioned operations to the training images and generated their corresponding estimated obstacle locations and estimated protection zone regions. Then, (i) each of obstacle pairs of each of the estimated obstacle locations and each of their corresponding GT obstacle locations and (ii) each of obstacle pairs of each of the estimated protection zone locations associated with the obstacles and each of the GT protection zone locations may have been referred to, in order to generate at least one vehicle path loss and at least one distance, by using any of loss generating algorithms, e.g., a smooth-L1 loss algorithm and a cross-entropy loss algorithm. Thereafter, by referring to the distance loss and the path loss, backpropagation may have been performed to learn at least part of parameters of the data extraction network 2000. Parameters of the RPN can be trained also, but a usage of the RPN is a well-known prior art, thus further explanation is omitted.

Herein, the data vectorizing layer 2400 may have been implemented by using a rule-based algorithm, not a neural network algorithm. In this case, the data vectorizing layer 2400 may not need to be trained, and may just be able to perform properly by using its settings inputted by a manager.

As an example, the first feature extracting layer 2100, the ROI pooling layer 2200 and the first outputting layer 2300 may be acquired by applying a transfer learning, which is a well-known prior art, to an existing object detection network such as VGG or ResNet, etc.

Figure 15:
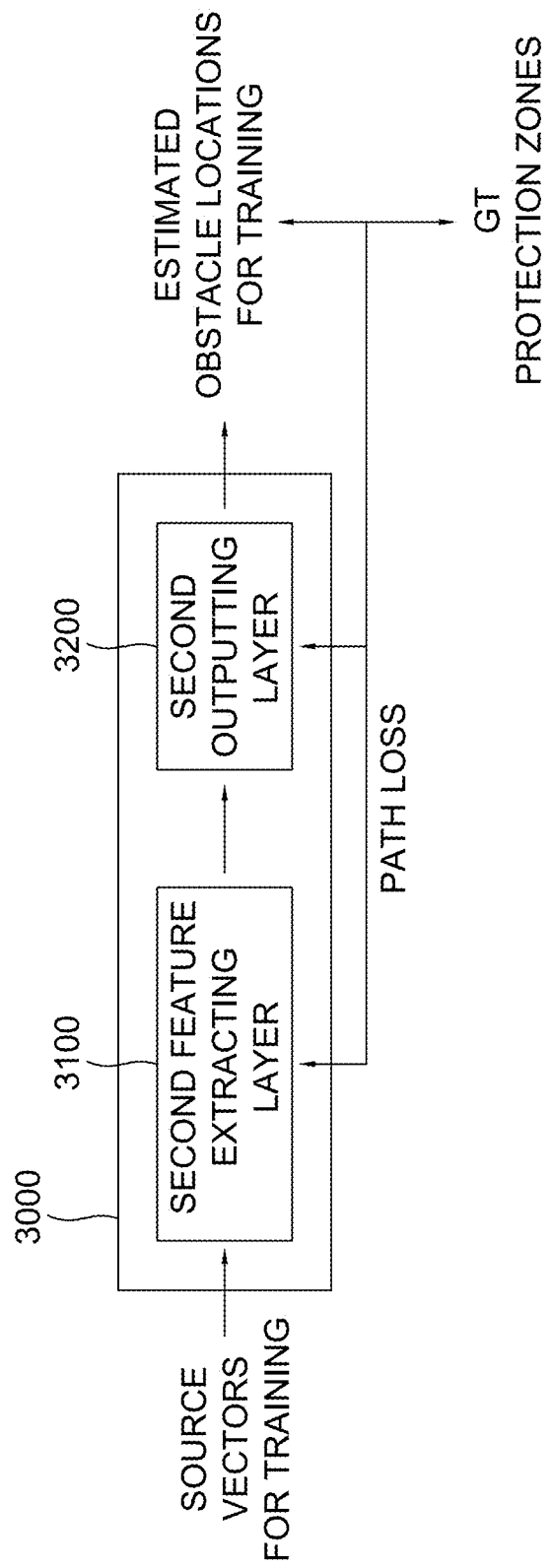
FIG. 15 is a diagram of a data analysis network according to one or more aspects of the present disclosure.
Figure 16:
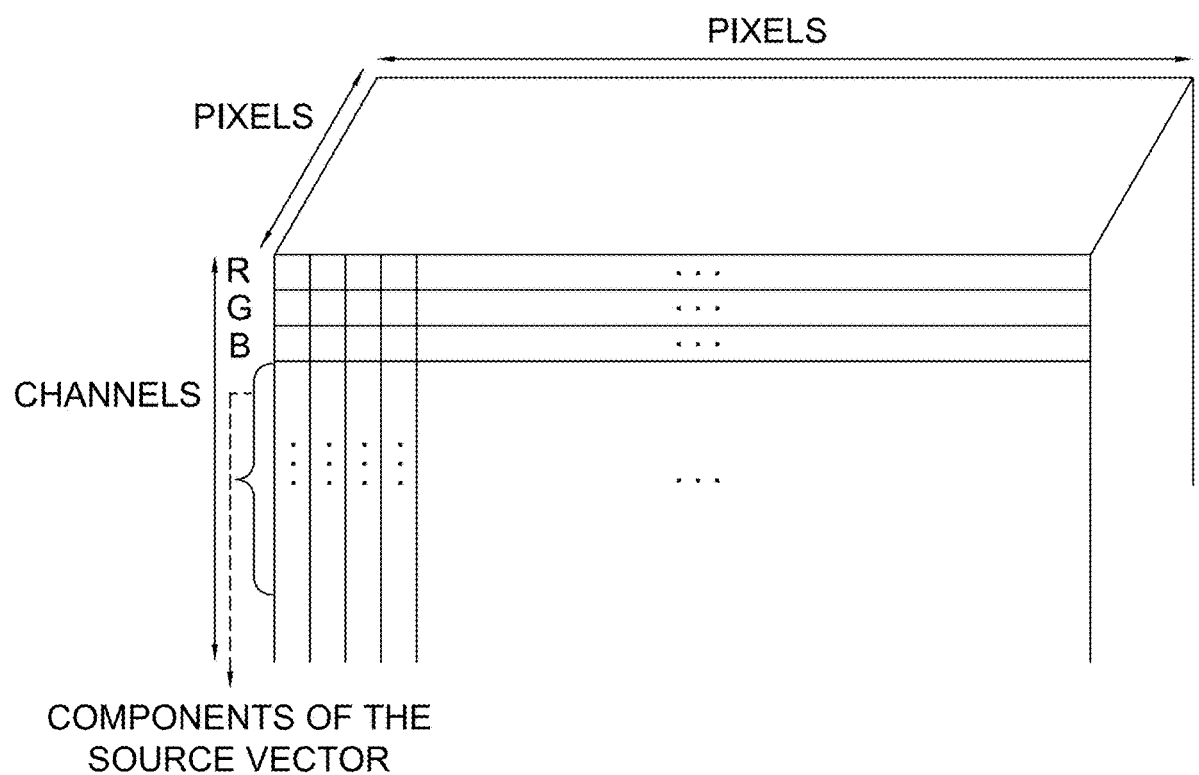
FIG. 16 is a diagram of a concatenated source feature map according to one or more aspects of the present disclosure.

Second, by referring to FIG. 15, the data analysis network 3000 may have been trained by using (i) a plurality of source vectors for training, including apparent distances for training and apparent sizes for training as their components, and (ii) a plurality of their corresponding GT protection zones. More specifically, the data analysis network 3000 may have applied aforementioned operations to the source vectors for training, to thereby calculate their corresponding estimated protection zones for training. Then each of distance pairs of each of the estimated protection zones and each of their corresponding GT protection zones may have been referred to, in order to generate at least one distance loss, by using said any of loss algorithms. Thereafter, by referring to the distance loss, backpropagation can be performed to learn at least part of parameters of the data analysis network 3000.

After performing such training processes, the computing device 1000 can properly calculate the estimated protection zone by using the subject image including the scene photographed from the front of the subject roadway.

Hereafter, another example will be presented. A second example is similar to the first example, but different from the first example in that the source vector thereof further includes a tilt angle, which is an angle between an optical axis of a camera which has been used for photographing the subject image (e.g., the subject obstacle) and a distance to the obstacle. Also, in order to calculate the tilt angle to be included in the source vector, the data extraction network of the second example may be slightly different from that of the first one. In order to use the second example, it should be assumed that information on a principal point and focal lengths of the camera are provided.

Specifically, in the second example, the data extraction network 2000 may have been trained to further detect lines of a road in the subject image, to thereby detect at least one vanishing point of the subject image. Herein, the lines of the road may denote lines representing boundaries of the road located on the obstacle in the subject image, and the vanishing point may denote where extended lines generated by extending the lines of the road, which are parallel in the real world, are gathered. As an example, through processes performed by the first feature extracting layer 2100, the ROI pooling layer 220 and the first outputting layer 2300, the lines of the road may be detected.

After the lines of the road are detected, the data vectorizing layer 240 may find at least one point where the most extended lines are gathered, and determine it as the vanishing point. Thereafter, the data vectorizing layer 2400 may calculate the tilt angle by referring to information on the vanishing point, the principal point and the focal lengths of the camera by using a following formula:

$$\theta_{tilt} = \mathrm{atan}\, 2(vy - cy, fy)$$

In the formula, vy may denote a y-axis (distance direction) coordinate of the vanishing point, cy may denote a y-axis coordinate of the principal point, and fy may denote a y-axis focal length. Using such formula to calculate the tilt angle is a well-known prior art, thus more specific explanation is omitted.

After the tilt angle is calculated, the data vectorizing layer 2400 may set the tilt angle as a component of the source vector, and the data analysis network 3000 may use such source vector to calculate the estimated protection zone. In this case, the data analysis network 3000 may have been trained by using the source vectors for training additionally including tilt angles for training.

For a third example which is mostly similar to the first one, some information acquired from a subject obstacle DB storing information on subject obstacles, including the subject obstacle, can be used for generating the source vector. That is, the computing device 1000 may acquire structure information on a structure of the subject vehicle, e.g., 4 doors, vehicle base length of a certain number of feet, from the subject vehicle DB. Or, the computing device 1000 may acquire topography information on a topography of a region around the subject vehicle, e.g., hill, flat, bridge, etc., from location information for the particular roadway. Herein, at least one of the structure information and the topography information can be added to the source vector by the data vectorizing layer 2400, and the data analysis network 3000, which has been trained by using the source vectors for training additionally including corresponding information, i.e., at least one of the structure information and the topography information, may use such source vector to calculate the estimated protection zone.

As a fourth example, the source vector, generated by using any of the first to the third examples, can be concatenated channel-wise to the subject image or its corresponding subject segmented feature map, which has been generated by applying an image segmentation operation thereto, to thereby generate a concatenated source feature map, and the data analysis network 3000 may use the concatenated source feature map to calculate the estimated protection zone. An example configuration of the concatenated source feature map may be shown in FIG. 16. In this case, the data analysis network 3000 may have been trained by using a plurality of concatenated source feature maps for training including the source vectors for training, other than using only the source vectors for training. By using the fourth example, much more information can be inputted to processes of calculating the estimated protection zone, thus it can be more accurate. Herein, if the subject image is used directly for generating the concatenated source feature map, it may require too much computing resources, thus the subject segmented feature map may be used for reducing a usage of the computing resources.

Descriptions above are explained under an assumption that the subject image is a photograph of the back of the subject vehicle, however, embodiments stated above may be adjusted to be applied to the subject image photographed from other sides of the subject vehicle. And such adjustment will be easy for a person in the art, referring to the descriptions.

Returning to the description of the object recognition unit 701, the result of recognition by the object recognition unit 701 is transmitted to a map generation unit 702. The map generation unit 702 divides an area around the subject vehicle into a plurality of areas (e.g., front, right, left, and rear areas), and performs map generation processing for each area. In the map generation processing, the object information recognized by the cameras 50 and the object information recognized by the radars 51 are integrated together for each area and reflected on the map.

The vehicle external environment estimation unit 703 (corresponding to the vehicle external environment estimation unit 111) uses the map generated by the map generation unit 702 to estimate the vehicle external environment through image recognition processing using deep learning. Specifically, the vehicle external environment estimation unit 703 generates a 3D map representing the vehicle external environment through the image recognition processing based on an environment model 704 constructed using deep learning. In the deep learning, a multilayer neural network (e.g., a deep neural network (DNN)) is used. Examples of the multilayer neural network include a convolutional neural network (CNN). More specifically, the vehicle external environment estimation unit 703 (1) combines the maps for the areas and generates the integrated map representing the surroundings of the subject vehicle 1, (2) estimates the displacements of the distances, directions, and relative speeds of moving objects within the integrated map with respect to the subject vehicle 1, and (3) incorporates the result into the vehicle external environment model 704. In addition, the vehicle external environment estimation unit 703 (4) estimates the position of the subject vehicle 1 on the integrated map based on a combination of highly accurate map information taken from the inside or outside of the vehicle, positional information obtained by the GPS or the like, vehicle speed information, and six-axis information, and (5) calculates the route costs described above, and (6) incorporates the result into the external environment model 704 together with the motion information of the subject vehicle 1 obtained by the various sensors. Through the series of processing, the external environment model 704 is updated by the vehicle external environment estimation unit 703 as needed, and is used for the route generation by the route generation unit 705.

The signals of the positioning system such as the GPS, and the data, e.g., for car navigation transmitted from the external network are transmitted to a route searching unit 706. The route searching unit 706 searches for a wide-area route of the vehicle using the signals of the positioning system such as the GPS or the data, for example, for the navigation system transmitted from the external network.

The route generation unit 705 generates the travel route of the vehicle based on the external environment model 704 and the output from the route searching unit 706. A specific route searching method by the main arithmetic unit 700 has been described as a calculation method of the first route in the section of "2-1. Calculation of First Route and Second Route" of the embodiment. The function described so far is an example of the route generation by deep learning, and is route generation that realizes a functional safety level equivalent to ASIL-B.

—2-2. Safety Function Unit—

A configuration of the safety function unit 800 and rule-based route generation by the safety function unit 800 will be described below.

As shown in FIG. 9, the safety function unit 800 includes, just like the main arithmetic unit 700, an object recognition unit 801 that recognizes an object (target object) outside the vehicle based on the input from the cameras 50 and/or the radars 51. The safety function unit 800 recognizes an object outside the vehicle in the same manner as the main arithmetic unit 700, and then determines what the recognized object is by a known rule-based method without using deep learning. For example, the safety function unit 800 determines what the recognized object is through a known discriminator having a functional safety level equivalent to ASIL-D.

The object recognized by the object recognition unit 801 is classified into a moving object or a stationary object. In FIG. 9, the classification is executed by a circuit block denoted by reference numeral 802 and indicated as "CLASSIFICATION OF MOVING OBJECT/STATIONARY OBJECT." Specifically, in this example, (1) an area around the subject vehicle is divided into a plurality of areas (e.g., front, right, left, and rear areas), (2) the object information recognized by the cameras 50 and the object information recognized by the radars 51 are integrated for each area, and (3) classification information of the moving and stationary objects is generated for each area. Then, (4) the classification results for each area are integrated together, and (5) are managed on a grid map, such as that shown in FIG. 2, as classification information of the moving and stationary objects around the subject vehicle. For the moving object, (6) a distance, a direction, and a relative speed with respect to the subject vehicle are estimated, and the result of the estimation is incorporated as associated information of the moving object, and (7) the position of the subject vehicle with respect to the moving object and the stationary object is estimated from the combination of highly accurate map information taken from the inside or outside the vehicle, positional information acquired by the GPS or the like, vehicle speed information, and six-axis information. The safety function unit 800 detects the state of the vehicle based on the vehicle speed information and the six-axis information, and uses the detected vehicle state as associated information of the subject vehicle 1 for the route generation. The safety function unit 800 generates a route based on the estimated position of the subject vehicle with respect to the moving object/stationary object and the search result of the safe area. The safe area corresponds to the second safe area SA2 described in the embodiments. The setting of the safe area is performed in the same manner as the setting of the second safe area SA2 by the safe area setting unit 122 in the above embodiments. The route generation is also performed in the same manner as the route generation by the second route calculation unit 123, and thus, the detailed description thereof is omitted. The function described so far is an example of the rule-based route generation, and is route generation that realizes a functional safety level equivalent to ASIL-D.

The routes generated by the main arithmetic unit 700 and the safety function unit 800 are sent to the target motion determination unit 730, and an optimum target motion is determined in accordance with the result of comparison between the routes. For example, as described in the embodiment, when the route generated by the main arithmetic unit 700 deviates from the safe area searched by the safety function unit 800, the route generated by the safety function unit 800 is adopted. The target motion determination unit 730, a vehicle kinetic energy operation unit 740, and an energy management unit 750 correspond to the target motion determination unit 130 and the energy management unit 140 described in the aforementioned embodiment, and will not be described in detail below.

—2-3. Backup Safety Function Unit—

A configuration of the backup safety function unit 900 and rule-based route generation by the backup safety function unit 900 will be described below. The backup safety function unit 900 is provided with a configuration required to enable an operation of moving to and stopping at a minimum safe stop position based on a rule. This configuration can be roughly realized by the function similar to the safety function unit 800.

As shown in FIG. 9, the object is classified into a moving object or a stationary object in the backup safety function unit 900 based on the result of recognition by the object recognition unit 801. In FIG. 9, the classification is executed by a circuit block denoted by reference numeral 903 and indicated as "CLASSIFICATION OF MOVING OBJECT/STATIONARY OBJECT." As shown in FIG. 9, the object recognition unit 801 may be common to the safety function unit 800, or may be separately provided in the backup safety function unit 900. Further, the backup safety function unit 900 includes a vehicle state measurement unit 901 that measures the state of the vehicle, and a driver's operation recognition unit 902 that recognizes the state of operation by the driver. The vehicle state measurement unit 901 acquires the state of the vehicle based on the vehicle speed information and the six-axis information so that the vehicle's state is used as associated information of the subject vehicle 1 for the route generation. The driver's operation recognition unit 902 is a function corresponding to the monitoring unit 400. The other functions are provided independently of the main arithmetic unit 700 and the safety function unit 800, but the substantial functions are the same as those of the configuration described above, and thus, are not described in detail.

INDUSTRIAL APPLICABILITY

The present disclosure is useful as an automotive arithmetic system mounted on a motor vehicle.

The invention claimed is:

1. An automotive arithmetic system mounted on a motor vehicle, the automotive arithmetic system comprising:
    circuitry configured to
        estimate a vehicle external environment including a road and an obstacle using deep learning based on an output from a vehicle external information acquisition device that acquires information of the vehicle external environment,
        generate a travel route of the motor vehicle based on the estimated vehicle external environment,
        estimate the presence of the road and the obstacle based on the output from the vehicle external information acquisition device according to a predetermined rule without using deep learning,
        generate a rule-based travel route in a free space on the road where no obstacle is present,
        generate a safe route, which is a travel route that the motor vehicle takes until the motor vehicle stops at a safe stop position that satisfies a preset criterion, based on the output from the vehicle external information acquisition device without using deep learning,
        prioritize one of the travel route, the rule-based travel route, or the safe route,
        determine a target motion of the motor vehicle so that the motor vehicle travels on the prioritized route, and
        execute an arithmetic operation to generate the travel route, an arithmetic operation to generate the rule-based travel route, and an arithmetic operation to generate the safe route independently of each other.

2. The automotive arithmetic system of claim 1, wherein the circuitry is further configured to
    determine the route to be prioritized based on an output from a vehicle internal information acquisition device that acquires vehicle internal environment information including a state of the motor vehicle and a condition of a driver.

3. The automotive arithmetic system of claim 2, wherein the circuitry is further configured to
    prioritize the safe route in response to a determination that the motor vehicle failed based on the state of the vehicle received from the vehicle internal information acquisition device.

4. The automotive arithmetic system of claim 2, wherein the circuitry is further configured to
    prioritize the safe route in response to a determination that a driving ability of the driver decreased based on the state of the vehicle received from the vehicle internal information acquisition device.

5. The automotive arithmetic system of claim 3, wherein the circuitry for prioritizing the safe route is further configured to cause at least one of a lighting device, a sounding device, or a wireless communication device mounted on the motor vehicle to operate in a mode different from a predetermined normal traveling mode.

6. The automotive arithmetic system of claim 4, wherein the circuitry for prioritizing the safe route is further configured to cause at least one of a lighting device, a sounding device, or a wireless communication device mounted on the motor vehicle to operate in a mode different from a predetermined normal traveling mode.

7. The automotive arithmetic system of claim 1, wherein the circuitry is further configured to
    set a target control amount for the target motion at a highest energy efficiency to achieve the target motion.

8. The automotive arithmetic system of claim 1, wherein the circuitry is further configured to
    set a target control amount for the target motion of the safe route at a highest energy efficiency to achieve the target motion.

9. The automotive arithmetic system of claim 1, wherein generation of the travel route and generation of the safe route occurs in parallel.

10. A method for operating an automotive arithmetic system mounted in a motor vehicle, comprising:
    estimating a vehicle external environment including a road and an obstacle using deep learning based on an output from a vehicle external information acquisition device that acquires information of the vehicle external environment;
    generating a travel route of the motor vehicle based on the estimated vehicle external environment;
    estimating the presence of the road and the obstacle based on the output from the vehicle external information acquisition device according to a predetermined rule without using deep learning;
    generating a rule-based travel route in a free space on the road where no obstacle is present;
    generating a safe route, which is a travel route that the motor vehicle takes until the motor vehicle stops at a safe stop position that satisfies a preset criterion, based on the output from the vehicle external information acquisition device without using deep learning;
    prioritizing one of the travel route, the rule-based travel route, or the safe route;
    determining a target motion of the motor vehicle so that the motor vehicle travels on the prioritized route; and
    executing an arithmetic operation to generate the travel route, an arithmetic operation to generate the rule-based travel route, and an arithmetic operation to generate the safe route independently of each other.

11. The method of claim 10, further comprising:
    determining the route to be prioritized based on an output from a vehicle internal information acquisition device that acquires vehicle internal environment information including a state of the motor vehicle and a condition of a driver.

12. The method of claim 11, further comprising:
    prioritizing the safe route in response to a determination that the motor vehicle failed based on the state of the vehicle received from the vehicle internal information acquisition device.

13. The method of claim 11, further comprising:
    prioritizing the safe route in response to a determination that a driving ability of the driver decreased based on the state of the vehicle received from the vehicle internal information acquisition device.

14. The method of claim 12, wherein prioritizing the safe route causes at least one of a lighting device, a sounding device, or a wireless communication device mounted on the motor vehicle to operate in a mode different from a predetermined normal traveling mode.

15. The method of claim 13, wherein prioritizing the safe route causes at least one of a lighting device, a sounding device, or a wireless communication device mounted on the motor vehicle to operate in a mode different from a predetermined normal traveling mode.

16. The method of claim 10, further comprising:
setting a target control amount for the target motion at a highest energy efficiency to achieve the target motion.

17. The method of claim 10, further comprising:
setting a target control amount for the target motion of the safe route at a highest energy efficiency to achieve the target motion.

18. The method of claim 10, wherein generation of the travel route and generation of the safe route occurs in parallel.

19. A non-transitory computer-readable storage medium storing computer-readable instructions thereon which, when executed by a computer, cause the computer to perform a method for operating an automotive arithmetic system mounted in a motor vehicle, the method comprising:
  estimating a vehicle external environment including a road and an obstacle using deep learning based on an output from a vehicle external information acquisition device that acquires information of the vehicle external environment;
  generating a travel route of the motor vehicle based on the estimated vehicle external environment;
  estimating the presence of the road and the obstacle based on the output from the vehicle external information acquisition device according to a predetermined rule without using deep learning;
  generating a rule-based travel route in a free space on the road where no obstacle is present;
  generating a safe route, which is a travel route that the motor vehicle takes until the motor vehicle stops at a safe stop position that satisfies a preset criterion, based on the output from the vehicle external information acquisition device without using deep learning;
  prioritizing one of the travel route, the rule-based travel route, or the safe route;
  determining a target motion of the motor vehicle so that the motor vehicle travels on the prioritized route; and
  executing an arithmetic operation to generate the travel route, an arithmetic operation to generate the rule-based travel route, and an arithmetic operation to generate the safe route independently of each other.

20. The non-transitory computer-readable storage medium of claim 19, further comprising:
determining the route to be prioritized based on an output from a vehicle internal information acquisition device that acquires vehicle internal environment information including a state of the motor vehicle and a condition of a driver.

* * * * *